US012804482B2

(12) United States Patent
Li et al.

(10) Patent No.: US 12,804,482 B2
(45) Date of Patent: Nov. 17, 2026

(54) SYSTEMS AND METHODS FOR OPTIMIZING SUCCESSFUL PRIMARY CELLS IN SECONDARY CELL GROUPS CHANGE PROCESSES

(71) Applicant: ZTE Corporation, Guangdong (CN)

(72) Inventors: Dapeng Li, Shenzhen (CN); Yin Gao, Shenzhen (CN); Zhuang Liu, Shenzhen (CN); Jiren Han, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 273 days.

(21) Appl. No.: 18/660,872

(22) Filed: May 10, 2024

(65) Prior Publication Data

US 2024/0298220 A1 Sep. 5, 2024

Related U.S. Application Data

(63) Continuation of application No. PCT/CN2022/110944, filed on Aug. 8, 2022.

(51) Int. Cl.
*H04W 36/00* (2009.01)
*H04W 36/08* (2009.01)

(52) U.S. Cl.
CPC ....... *H04W 36/0069* (2018.08); *H04W 36/08* (2013.01)

(58) Field of Classification Search
CPC ............. H04W 36/0069; H04W 36/08; H04W 36/0064; H04W 36/0079; H04W 36/00837; H04W 36/00222; H04W 36/0061
See application file for complete search history.

(56) References Cited

U.S. PATENT DOCUMENTS

2023/0422135 A1 12/2023 Wu et al.
2024/0260110 A1* 8/2024 Shimoda ................. H04W 4/06
2025/0184836 A1* 6/2025 Wu ................... H04W 36/0061
(Continued)

FOREIGN PATENT DOCUMENTS

CN 114503666 A 5/2022
CN 114845319 A 8/2022
EP 4 207 865 A1 7/2023
(Continued)

OTHER PUBLICATIONS

Ericsson, "[Offline 801][SON/MDT] Handover related SON aspects (Ericsson)", 3GPP TSG-RAN WG2 #114-e, Tdoc R2-2106690, May 27, 2021, Electronic meeting (62 pages).
(Continued)

*Primary Examiner* — Khoa Huynh
(74) *Attorney, Agent, or Firm* — Foley & Lardner LLP

(57) ABSTRACT

Presented are systems, methods, apparatuses, or computer-readable media for optimizing successful primary cells in secondary cell groups (PSCell) change processes. A secondary communication node may transmit, to a wireless communication device, prior to requesting a handover procedure to change a PSCell in the secondary communication node, a first message optionally indicating respective thresholds of one or more successful PSCell change timers. The secondary communicate node may receive, from a master communication node, a second message including a report associated with the handover procedure.

20 Claims, 17 Drawing Sheets

(56) References Cited

U.S. PATENT DOCUMENTS

2025/0193760 A1 * 6/2025 Yan ................. H04W 36/00222

FOREIGN PATENT DOCUMENTS

| | | |
|---|---|---|
| WO | WO-2021/066515 A1 | 4/2021 |
| WO | WO-2022/044908 A1 | 3/2022 |
| WO | WO-2022/110008 A1 | 6/2022 |

OTHER PUBLICATIONS

Ericsson, "Clarifications to WID on further enhancement of data collection for SON-MDT in NR standalone and MR-DC", 3GPP TSG-RANP #96, RP-221624, Jun. 9, 2022, Budapest, Hungary (3 pages).
Extended European Search Report for EP Appl. No. 22954250.1, dated Dec. 3, 2024 (15 pages).
Huawei et al., "Discussion on other SON aspects", 3GPP TSG RAN WG2 #113b-e, R2-2103733, Apr. 20, 2021, Electronic Meeting (11 pages).
Huawei, "(TP for SON BLCR for 38.423) MRO for SN Change Failure", 3GPP TSG-RAN WG3 Meeting #110-e, R3-206191, Nov. 12, 2020, E-Meeting (11 pages).
International Search Report and Written Opinion for PCT Appl. No. PCT/CN2022/110944 mailed Dec. 22, 2022. (8 pages).

* cited by examiner

SYSTEMS AND METHODS FOR OPTIMIZING SUCCESSFUL PRIMARY CELLS IN SECONDARY CELL GROUPS CHANGE PROCESSES

CROSS-REFERENCE TO RELATED APPLICATION

This application claims the benefit of priority under 35 U.S.C. § 120 as a continuation of PCT Patent Application No. PCT/CN2022/110944, filed on Aug. 8, 2022, the disclosure of which is incorporated herein by reference in its entirety.

TECHNICAL FIELD

The disclosure relates generally to wireless communications, including but not limited to systems and methods for optimizing successful primary cells in secondary cell groups (PSCell) change processes.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium for optimizing successful primary cells in secondary cell groups (PSCell) change processes. A secondary communication node may transmit, to a wireless communication device, prior to requesting a handover procedure to change a PSCell in the secondary communication node, a first message optionally indicating respective thresholds of one or more successful PSCell change timers. The secondary communicate node may receive, from a master communication node, a second message including a report associated with the handover procedure.

In some embodiments, the report of the second message may include a Successful PSCell Change Report Container. In some embodiments, the report may be included in a third message directly sent from the wireless communication device to the master communication node. In some embodiments, the third message may be sent from the wireless communication device to the master communication node, in response to the wireless communication device determining that at least one of the one or more timers exceeds its corresponding threshold.

In some embodiments, the report may be included in a fourth message sent from the wireless communication device to a wireless communication node, and then in a fifth message sent from the wireless communication node to the master communication node. In some embodiments, the fourth message may be sent from the wireless communication device to the wireless communication node, in response to the wireless communication device determining that at least one of the one or more timers exceeds its corresponding threshold. In some embodiments, the report of the fifth message may include at least one of: a Successful PSCell Change Report List; a Successful PSCell Change Report List Item; or a Successful PSCell Change Report Container.

At least one aspect is directed to a system, a method, an apparatus, or a computer-readable medium for optimizing successful primary cells in secondary cell groups (PSCell) change processes. A first master communication node may transmit a first message requesting a handover procedure to change a first PSCell in a first secondary communication node. The wireless communication device may receive or transmit a second message including a report associated with the handover procedure.

In some embodiments, the report may include at least one of: an identification of the first PSCell; an identification of a second PSCell to which the first PSCell is changed; an identification of a PCell in the first master communication node; a measurement result of one or more neighbor cells; a Successful PSCell Change cause; a location; a Cell Radio Network Temporary Identifier (C-RNTI) of the first PSCell; or a Cell Radio Network Temporary Identifier (C-RNTI) of the second PSCell. In some embodiments, the report of the second message may include a Successful PSCell Change Report Container.

In some embodiments, the first master communication node may transmit, to a second secondary communication node, a third message requesting to add the second secondary communication node. In response to transmitting the third message, the first master communication node may receive, from the second secondary communication node, a fourth message optionally indicating a threshold of a first PSCell timer. The first master communication node may transmit, to the first secondary communication node, the first message requesting to remove the first secondary communication node. In response to transmitting the first message, the first master communication node may receive, from the first secondary communication node, a fifth message optionally indicating respective thresholds of a second PSCell timer and a third PSCell timer. The first master communication node may transmit, to the first secondary communication node, the second message including the report. In some embodiments, the third message may include a Request Threshold Type Indication.

In some embodiments, the first master communication node may transmit, to a second secondary communication node, a third message requesting to add the second secondary communication node. In some embodiments, in response to transmitting the third message, receiving, the first master communication node may receive from the second secondary communication node, a fourth message optionally indicating a threshold of a first PSCell timer. In some embodiments, the first master communication node may transmit, to the first secondary communication node, the first message requesting to remove the first secondary communication node. In some embodiments, the first master communication node may in response to transmitting the first message, the first master communication node may receive, from the first secondary communication node, a fifth message indicating respective thresholds of a second PSCell timer and a third PSCell timer. In some embodiments, the first master communication node may receive, from the second secondary communication node, a sixth message including the report. In some embodiments, the first master communication node may transmit, to the first secondary communication node, the second message including the report.

In some embodiments, the report of the sixth message may include at least one of: a Successful PSCell Change Report List; a Successful PSCell Change Report List Item; or a Successful PSCell Change Report Container. In some embodiments, the first master communication node may transmit, to a second secondary communication node, a third message requesting to add the second secondary communication node. In some embodiments, in response to transmitting the third message, the first master communication node may receive, from the second secondary communication node, a fourth message optionally indicating a threshold of a first PSCell timer. In some embodiments, the first master communication node may transmit, to the first secondary communication node, the first message requesting to remove the first secondary communication node. In some embodiments, in response to transmitting the first message, receiving, the first master communication node may receive, from the first secondary communication node, a fifth message optionally indicating respective thresholds of a second PSCell timer and a third PSCell timer. In some embodiments, the first master communication node may receive, from the first secondary communication node, the second message including the report.

In some embodiments, the first master communication node may transmit to the first secondary communication node, a third message requesting to add a second secondary communication node. In some embodiments, in response to transmitting the third message, the first master communication node may receive, from the first secondary communication node, a fourth message optionally indicating respective thresholds of a first PSCell timer and a second PSCell timer. In response to receiving a fifth message from a second master communication node requesting to add the second secondary communication node, the second secondary communication node may transmit a sixth message optionally indicating a threshold of a third PSCell timer. In some embodiments, the first master communication node may receive, from a wireless communication node, a seventh message including the report. In some embodiments, the first master communication node may transmit, to the first secondary communication node, the second message including the report.

At least one aspect is directed to a system, a method, an apparatus, or a computer-readable medium for optimizing successful primary cells in secondary cell groups (PSCell) change processes. A first secondary communication node may transmit, to a master communication node, a first message requesting a handover procedure to change a first PSCell in the first secondary communication node. The first secondary communication node may receive, from the master communication node, a second message including a report associated with the handover procedure.

In some embodiments, the first message may optionally indicate respective thresholds of a first PSCell timer and a second PSCell timer. In response to receiving a third message from the master communication node requesting to add a second secondary communication node, the second secondary communication node may transmit a fourth message indicating a threshold of a third PSCell timer to the master communication node.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and case of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
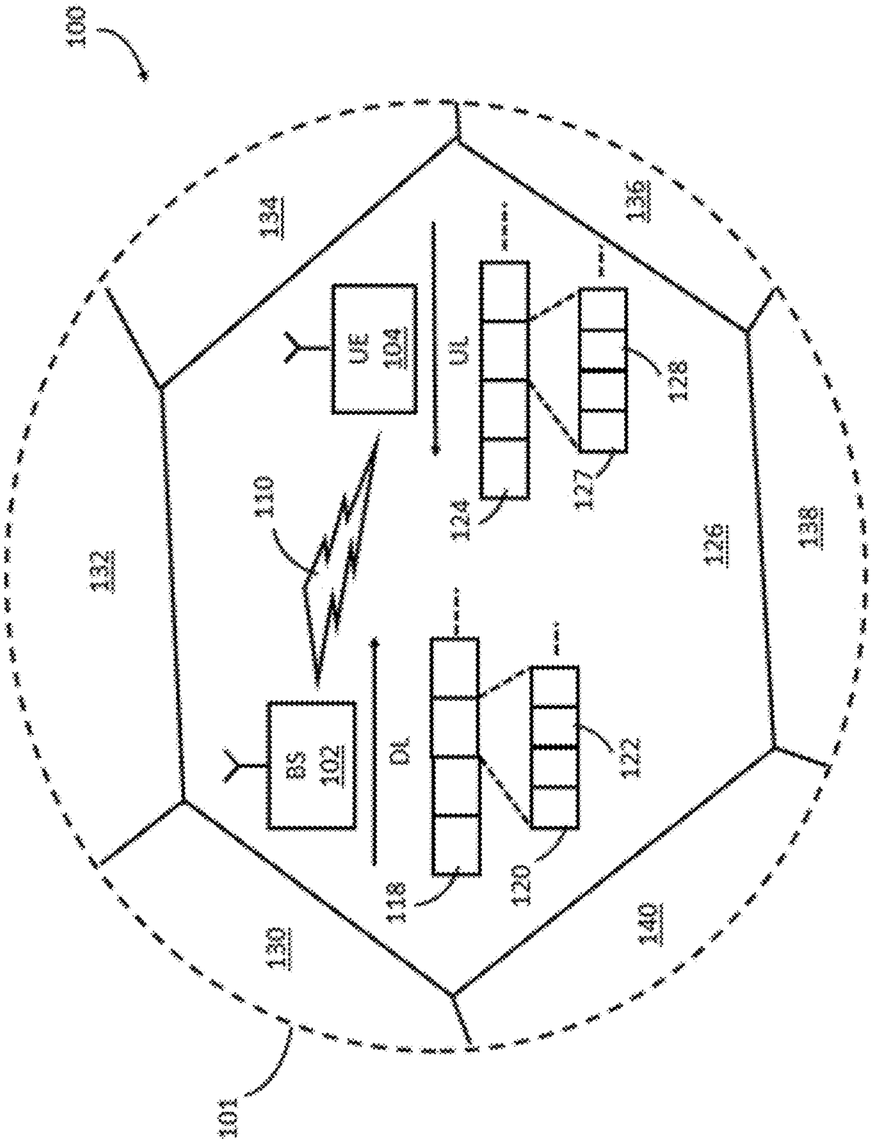
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
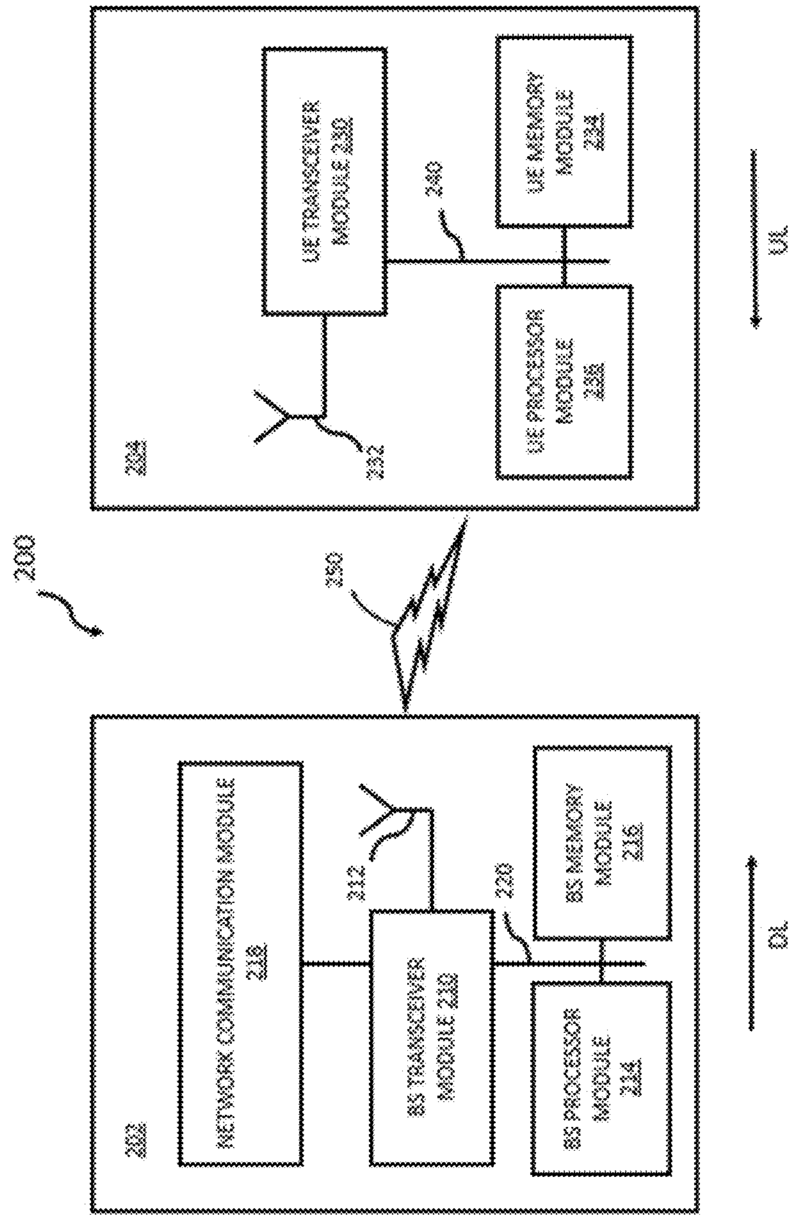
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Optimizing Successful Primary Cells in Secondary Cell Groups (PSCell) Change Processes The PSCell change procedure may be performed in a multi-radio access technology (RAT) dual connectivity (MR-DC)(e.g., as defined in the 3GPP Release 15). However, identifying and optimizing the auccessful handover problem in a primary cell in a secondary cell group (PSCell) change may be difficult.

Figure 3:
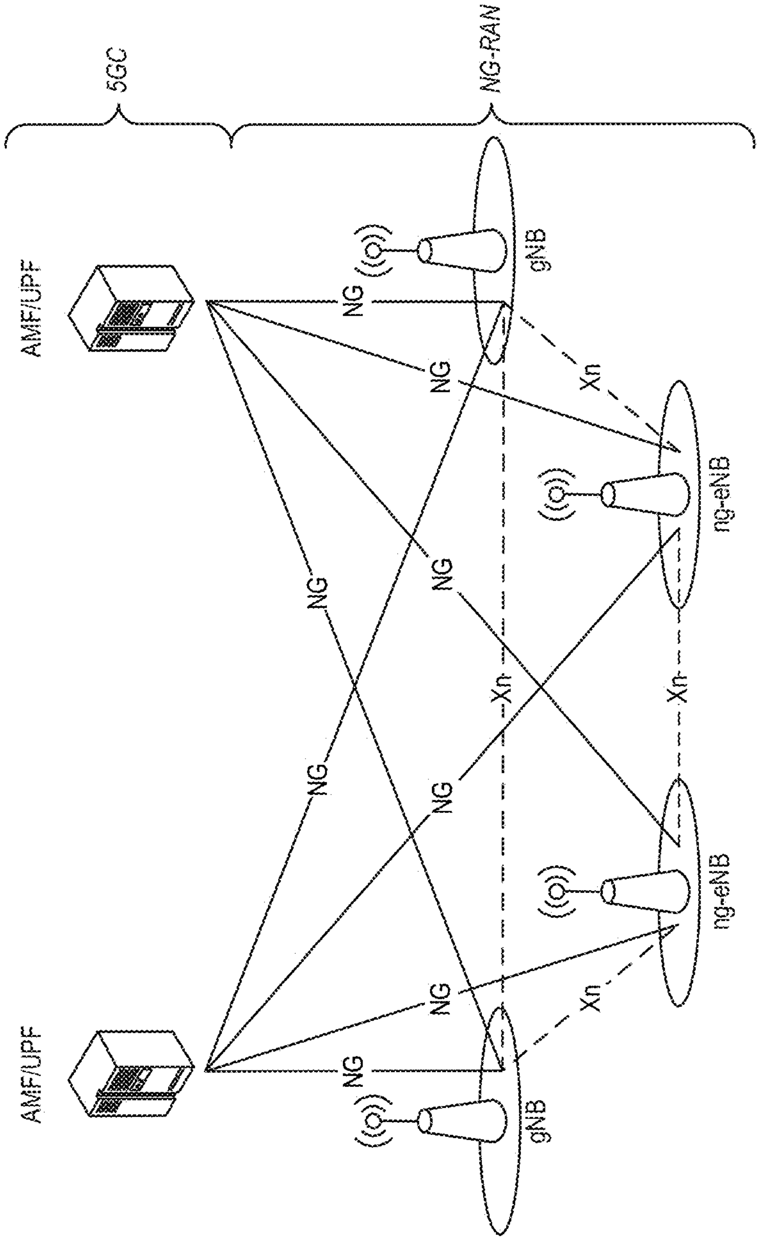
FIG. 3 illustrates a block diagram of an environment of a communication network for optimizing successful primary cells in secondary cell groups (PSCell) change processes, in accordance with an illustrative embodiment.

Referring now to FIG. 3, depicted is a block diagram of an environment of a communication network for optimizing successful primary cells in secondary cell groups (PSCell) change processes. As shown, a 5G core network (5G core) may be an access and mobility management function (AMF) and a user plane function (UPF). The new radio (NG) Evolved Universal Terrestrial Radio Access (E-UTRA) (NE) of the 5G access network may include ng-eNB or gNB. The NG interface may be used between the 5G access network and the core network.

Figure 4:
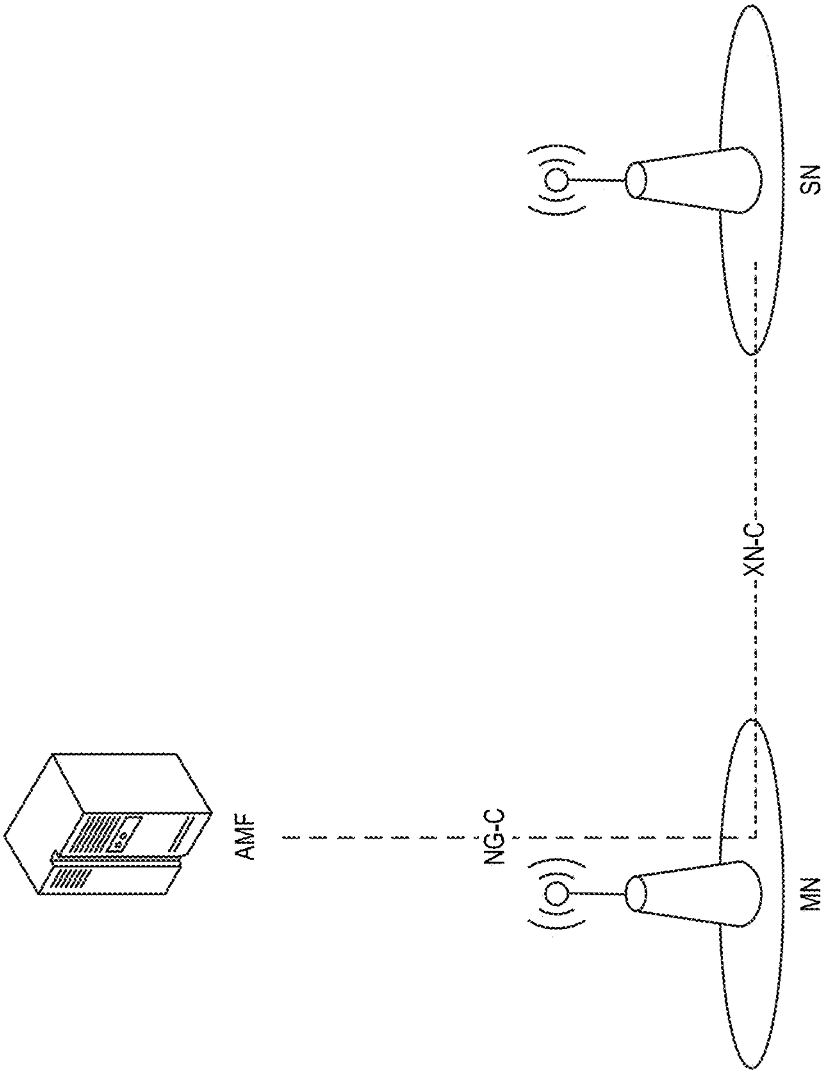
FIG. 4 illustrates a block diagram of a multi-radio access technology (RAT) dual connectivity (DC) control plane, in accordance with an illustrative embodiment.

Referring now to FIG. 4, depicted is a block diagram of a multi-radio access technology (RAT) dual connectivity control plane. As shown, Multi-Radio Dual Connectivity (MR-DC) may be a generalization of the Intra-E-UTRA Dual Connectivity (DC). In this case, a multiple receiver and transmitter (Rx/Tx) capable UE may be configured to utilize resources provided by two different nodes connected via a non-ideal backhaul, with one node providing NR access and the other node one providing either E-UTRA or NR access. One node may server as the master node (MN) and the other as the secondary node (SN). The MN and SN may be connected via a network interface and at least the MN is connected to the core network.

Figure 5:
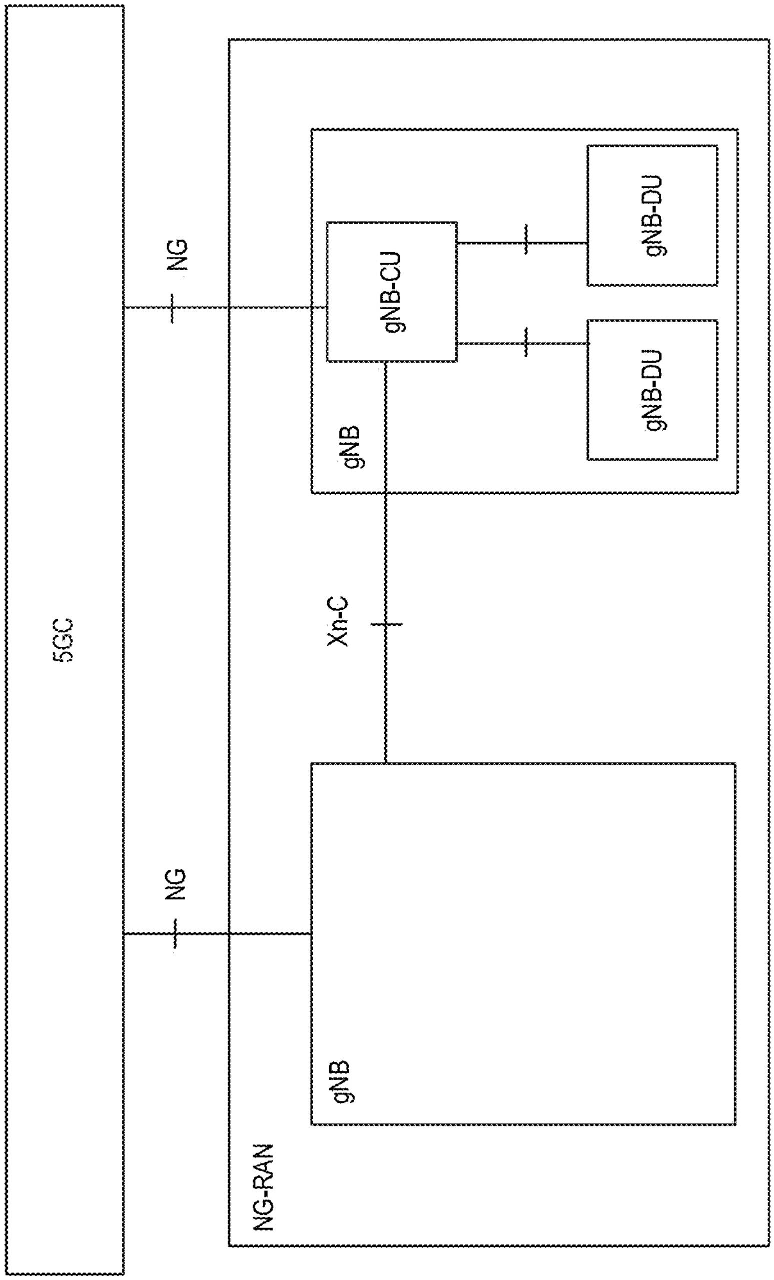
FIG. 5 illustrates a block diagram of a split architecture for centralized unit (CU) and distributed unit (DU), in accordance with an illustrative embodiment.

Referring now to FIG. 5, depicted is a block diagram of a split architecture for centralized unit (CU) and distributed unit (DU). The CU-DU split architecture in a gNB may include a gNB-CU and one or more gNB-DU(s). A gNB-CU and a gNB-DU may be connected via F1 interface.

The self-configuration process may in one where newly deployed nodes are configured by automatic installation procedures to obtain basic configuration for system operation. Following the deployment of an eNB in the LTE technology or a gNB in NR, different parameters may be configured and functions may be executed. The parameters and functions may include, for example: hardware and software installation; transport network discovery (e.g., internet protocol (IP) addresses, setup quality of service (QOS) parameters and interfaces, etc.); Automatic Neighbor Discovery (AND); radio parameter configuration (e.g., handover, selection-reselection, power settings, etc.); mobility load balancing; and power saving, among others.

Initial parameter settings can later be improved in the self-optimization process. Examples may include AND, or the Automatic Neighbor Relation Function (ANRF) (e.g., as defined in the LTE standard[TS 36.300] and NR Standard [TS 38.300]). The ANRF function may be based on the capability of a mobile to send to its serving eNB the Physical Cell Identity (PCI) of the cells it senses. The serving cell can then request from the mobile to send the Global Cell Identity (GCI) of the sensed eNB or gNB. Once the information is received, the serving gNB can decide to add this cell to its neighboring list. In a self-optimization process, the neighboring cell list can be updated to follow the evolution of the network.

Figure 6:
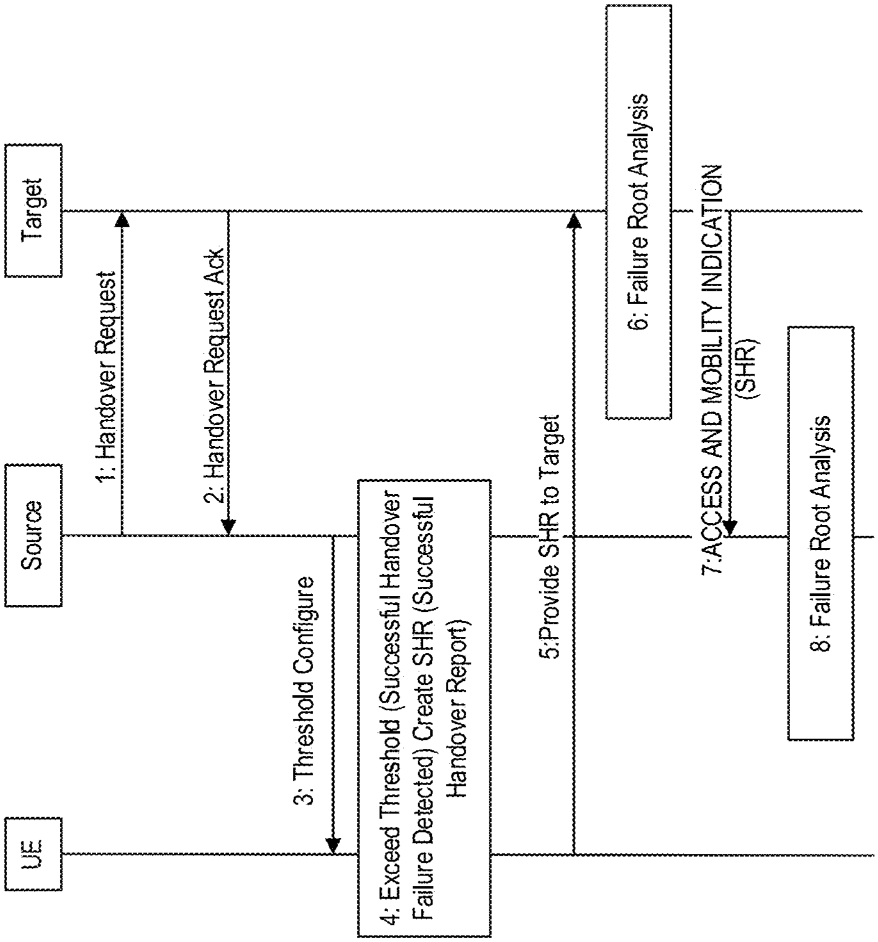
FIG. 6 illustrates a communication diagram of a procedure for a successful handover between a source next generation radio access network (NG-RAN) and a target NG-RAN, in accordance with an illustrative embodiment.

Referring now to FIG. 6, depicted is a communication diagram of a procedure for a successful handover between a source next generation radio access network (NG-RAN) and a target NG-RAN. As shown, the procedure of Successful handover (e.g., as defined in 3GPP Release 16) may be performed among a user equipment (UE), source, and target NG-RANs. When the source NG-RAN node is to decide to trigger a handover (HO), the source NG-RAN node may send the Handover Request message to the target NG-RAN node. This message may include the T310 and T314 timer threshold allocated by the source NG-RAN node.

The target NG-RAN node may allocate a Threshold of T304. The target NG-RAN node may store the threshold of the T310/T314/T304 in the successHO-Config structure. The Handover Request acknowledge message returned to the source NG-RAN node may contain successHO-Config. The successHO-Config information may be contained in Target NG-RAN node To Source NG-RAN node Transparent Container IE. After obtaining the successHO-Config information, the source NG-RAN node may send the threshold of the T310/T314/T304 to the UE through the RRC message RRCReconfiguration.

When the T310/T314/T304 timer of the UE exceeds threshold during the PCell handover process, successful handover failure may be considered to have occurred and Successful handover report (SHR) may be generated. This report may be recorded in the VarSuccessHO-Report variable of the UE and saved for a period of time (e.g., 48 hours). After the handover is completed, the UE may send the SHR to the target NG-RAN node. The target NG-RAN node may perform failure root analysis. The target NG-RAN node may send the SHR to the source NG-RAN node via the XN interface ACCESS AND Mobility Indication message.

In the MR-DC scenario, the UE may change PSCell in the SN node or between SN nodes. As a result, PSCell successful handover failure may also occur. How the NR system identifies failure and finally perform automatic optimization (SON) of this failure may be difficult to solve. Presented herein are communication of new messages and procedures to address the issue in optimizing successful PSCell change processes.

A. PSCell Change without Involving MN Scenario and UE Provides PSCell SHR to MN.

Figure 7:
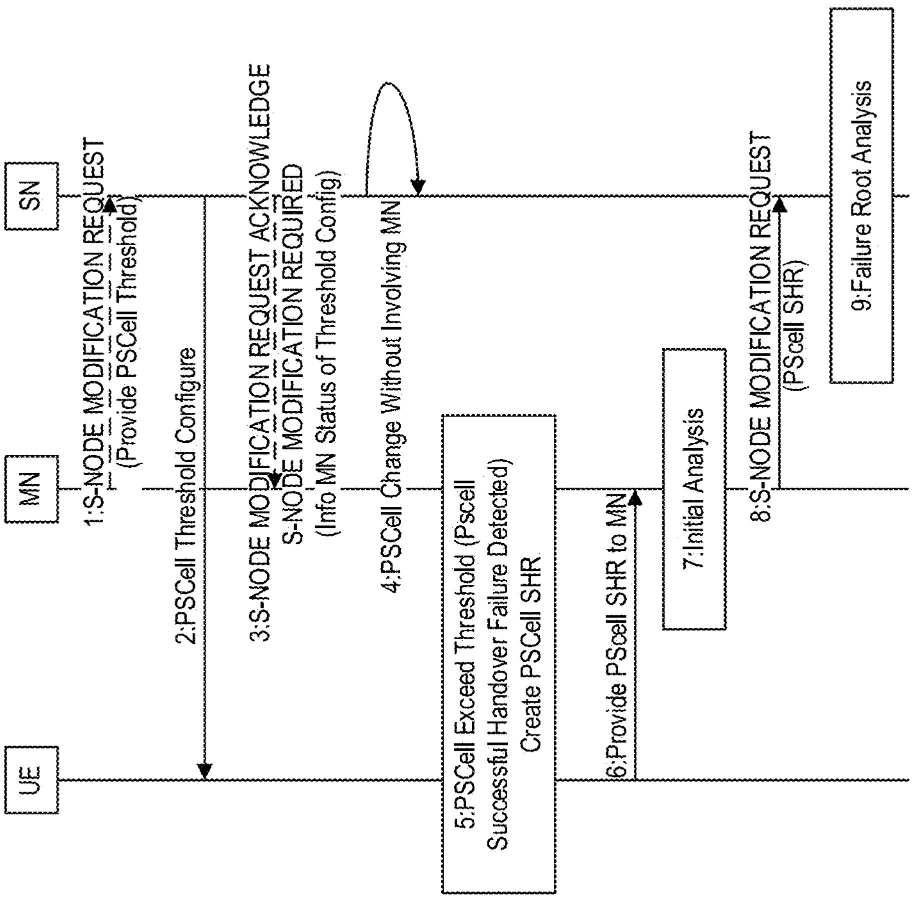
FIG. 7 illustrates a communication diagram of a procedure for a successful handover between a source NG-RAN and a target NG-RAN without involving a master node (MN) and a user equipment (UE) providing a successful handover report (SHR) to the MN, in accordance with an illustrative embodiment.

Referring now to FIG. 7, depicted is a communication diagram of a procedure for a successful handover between a source NG-RAN and a target NG-RAN without involving a master node (MN) and a user equipment (UE) providing a successful handover report (SHR) to the MN.

At step 1, the MN may provide the PSCell T304/T310/T312 threshold to the SN. The MN can send the configuration information to the SN via S-NODE Addition Request and S-NODE MODIFICATION REQUEST. If MN does not provide the above information, SN may provide PSCell T304/T310/T312 threshold independently.

At step 2, before triggering PSCell change without involve MN, the SN may send the PSCell T304/T310/T312 threshold to the UE. At step 3, the SN may inform the MN of the threshold configuration. This information may be used by the MN to optimize the MN configuration about PSCell T304/T310/T312 according to the feedback from multiple SNs. If the SN does not notify the MN, the MN may be configured with PSCell T304/T310/T312 independently.

At step 4, the SN may trigger the PSCell change without involving MN. In some embodiments, the SN can change the PSCELL of the UE without notifying the MN. At step 5, PSCell Successful Handover failure may be detected. When the T310/T314/T304 timer of the UE exceeds threshold during the PSCell change process, successful handover failure may be determined to have occurred and PSCell Successful handover report (PSCell SHR) may be generated. This report may be recorded in the UE's VarPscellSuccessHO-Report variable and saved for a period of time (e.g., 48 hours). In some embodiments, the PSCell Successful handover report may not be saved in the UE, but can be sent to the MN or SN through a radio resource control (RRC) message.

PSCellPSCell Successful Handover report may include one of the following information: (1) Source PSCell ID; (2) Target PSCell ID; (3) PcellID; (4) measurement result of neighbor cells; (5) PSCell cause; (6) location; (7) Source Pscell C-RNTI; and (8) Target PSCell C-RNTI, among others.

The Source/Target PSCell ID can be leveraged by receiving NG-RAN nodes to identify the SN node where SHR failure occur. The PCellID may be used by receiving NG-RAN nodes to identify the MN connected to the SHR failure SN node, because the receiving NG-RAN nodes may have no signalling connection or interface to the SHR failure SN node. The PSCell SHR can be relayed from MN to the SN. In addition, the PSCell SHR may also be used by MN to optimized network configuration (e.g., whether the MN to trigger PSCell change too early or too late).

Figure 8:
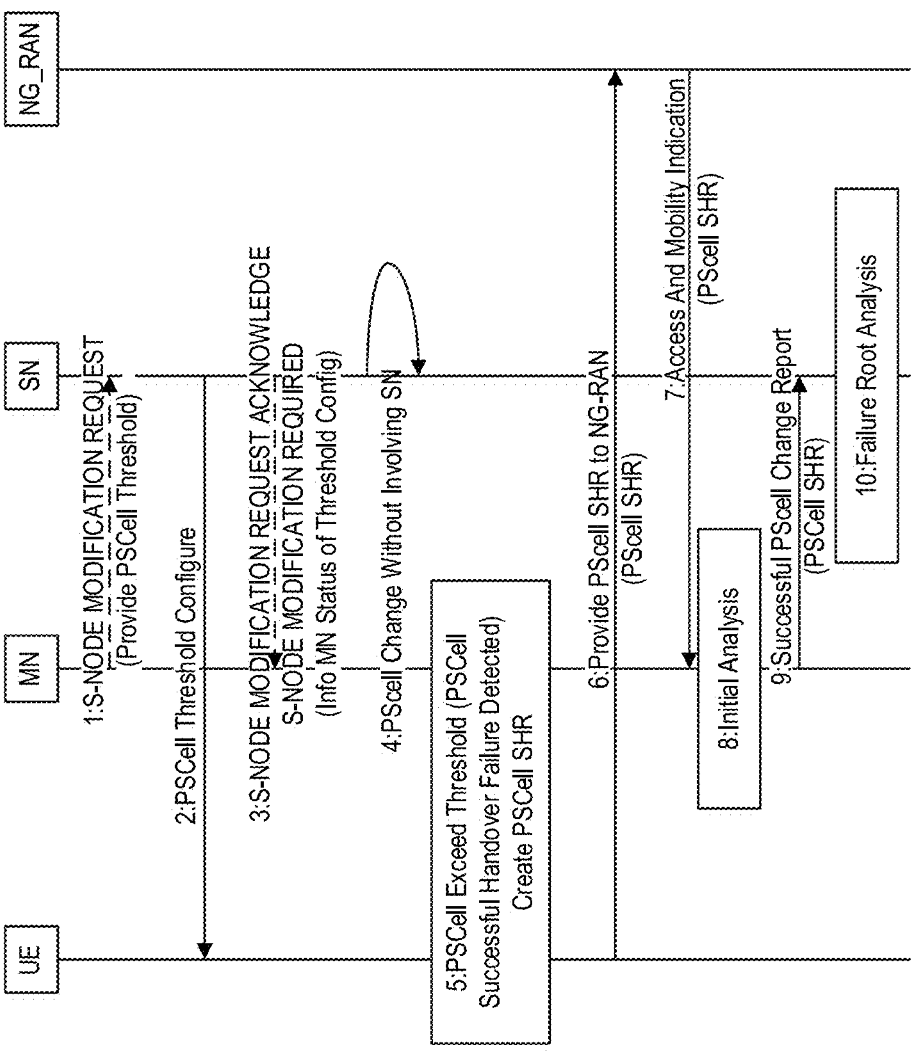
FIG. 8 illustrates a communication diagram of a procedure for a successful handover between a source NG-RAN and a target NG-RAN without involving a master node (MN) and a user equipment (UE) providing a successful handover report (SHR) to another node, in accordance with an illustrative embodiment.

At step 6, the UE may provide PSCell SHR to MN. For example, UE can send the PSCell SHR to the MN via the UEInformation message, or send the PSCell SHR to the MN via the SCGFailureReport message. At step 7 the MN may take initial analysis. At step 8, the MN send PSCell SHR to SN. Messages from the interfaces may not support sending PSCell SHR from the MN to the SN. The enhanced S-NODE MODIFICATION REQUEST message may be used instead. The message may include one or more information elements (IEs), including "Successful PSCell change Report Container":

B. PSCell Change without Involving MN and UE Providing PSCell SHR to a Third Node Referring now to FIG. 8, depicted is a communication diagram of a procedure for a successful handover between a source NG-RAN and a target NG-RAN without involving a master node (MN) and a user equipment (UE) providing a successful handover report (SHR) to another node. Steps 1-5 may be same as the steps 1-5 in the embodiment described in FIG. 7.

At step 6, the UE may provide PSCell SHR to a third NG-RAN node. At step 7, the third NG-RAN nodes may send message carrying Successful PSCell change report to MN. Based on information inside PSCell SHR, the third NG-RAN nodes may identify the MN connected to SN when PSCell SHR failure occur. The NG-RAN nodes may send messages to the MN.

NG-RAN nodes can reuse messages in existing Xn or NG interface. With Xn as an example, a PSCell Successful HO Report List IE may be added into ACCESS AND MOBILITY INDICATION message. The example definition of updated ACCESS AND MOBILITY INDICATION message is shown as below. This message may be sent by NG-RAN $node_1$ to transfer access and mobility related information to NG-RAN $node_2$. The direction may be from the NG-RAN $node_1$ to NG-RAN $node_2$.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| Response Information | M | | | | YES | ignore |
| >CHOICE Response Type | M | | | | — | |
| >>Configuration successfully applied | | | | | — | |
| >>>M-NG-RAN node to S-NG-RAN node Container | O | | OCTET STRING | Includes the RRCReconfigurationComplete message as defined in subclause 6.2.2 of TS 38.331 [10] or the RRCConnectionReconfiguration Complete message as defined in subclause 6.2.2 of TS 36.331 [14]. | — | |
| >>Configuration rejected by the M-NG-RAN node | | | | | — | |
| >>>Cause | M | | 9.2.3.2 | | — | |
| >>>M-NG-RAN node to S-NG-RAN node Container | O | | OCTET STRING | Includes the CG-ConfigInfo message as defined in as defined in subclause 11.2.2 of TS 38.331 [10]. | — | |
| Successful PSCell change Report Container | | | OCTET STRING | | YES | ignore |

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| RACH Report List | | 0 . . . 1 | | | YES | ignore |
| >RACH Report List Item | | 1 . . . <maxnoofRACHReports> | | | EACH | ignore |
| >>RACH Report Container | O | | OCTET STRING | RA-ReportList-r16 IE as defined in subclause 6.2.2 in TS 38.331 [10] | YES | ignore |
| >>UE Assistant Identifier | O | | NG-RAN node UE XnAP ID 9.2.3.16 | | YES | ignore |
| Successful HO Report List | | 0 . . . 1 | | | YES | ignore |
| >Successful HO Report List Item | | 1 . . . <maxnoofSuccessfulHOReports> | | | — | |
| >>Successful HO Report Container | O | | OCTET STRING | | — | |
| Successful PSCell Change Report List | | 0 . . . 1 | | | YES | ignore |
| >Successful PSCell Change Report List Item | | 1 . . . <maxnoofPSCellSuccessfulHOReports> | | | | |
| >>Successful PSCell Change Report Container | O | | OCTET STRING | | | |

With NG interface as another example, a Successful PSCell HO Report List may be introduced in SON Information Report IE. Then this IE may be carried in Downlink RAN configuration transfer or Uplink RAN configuration transfer messages. The new definition of updated SON Information Report is shown as below, including one or more IEs, such as. This IE may contain the configuration information to be transferred.

At step 8, the MN may enforce initial analysis based on received Successful PSCell HO Report. At step 9, the MN may send message to SN carry Successful PSCell Change report.

The MN may leverage legacy message define in Xn or use a new defined message to transfer the report. With legacy message in Xn as an example, a new Successful PSCell HO Report List may be introduced in a S-NODE MODIFICA-

| IE/Group Name | Presence | Range | IE type and reference | Semantics description | Criticality | Assigned Criticality |
|---|---|---|---|---|---|---|
| CHOICE SON Information Report | M | | | | — | |
| >Failure Indication Information | | | | | | |
| >>Failure Indication | M | | 9.3.3.37 | | — | |
| >HO Report Information | | | | | | |
| >>HO Report | M | | 9.3.3.39 | | — | |
| >Successful HO Report List | | | | | | |
| >>Successful HO Report List | | 1 | | | YES | ignore |
| >>>Successful HO Report Item | | 1 . . . <maxnoofSuccessfulHOReports> | | | — | |
| >>>>Successful HO Report Container | M | | OCTET STRING | SuccessHO-Report-r17 IE as defined in TS 38.331 [18]. | — | |
| >>Successful PSCell Change Report List | | 1 | | | YES | ignore |
| >>>Successful PSCell Change Report Item | | 1 . . . <maxnoofPSCell SuccessfulChangeReports> | | | — | |
| >>>>Successful PSCell Change Report Container | M | | OCTET STRING | SuccessPS Cell Change-Report. | — | |

TION REQUEST message. This message may be sent by the M-NG-RAN node to the S-NG-RAN node to either request the preparation to: modify S-NG-RAN node resources for a specific UE, to query for the current SCG configuration, to provide the S-RLF-related information to the S-NG-RAN node, or to provide Successful PSCell Change Report to the S-NG-RAN node, among others. The direction may be from the M-NG-RAN node to the S-NG-RAN node.

At step 10, the SN may enforce failure root analysis based on Successful PSCell change information. The SN may alter the coverage of PDCCH or PDSCH. The SN may optimize Timer threshold etc.

Figure 9:
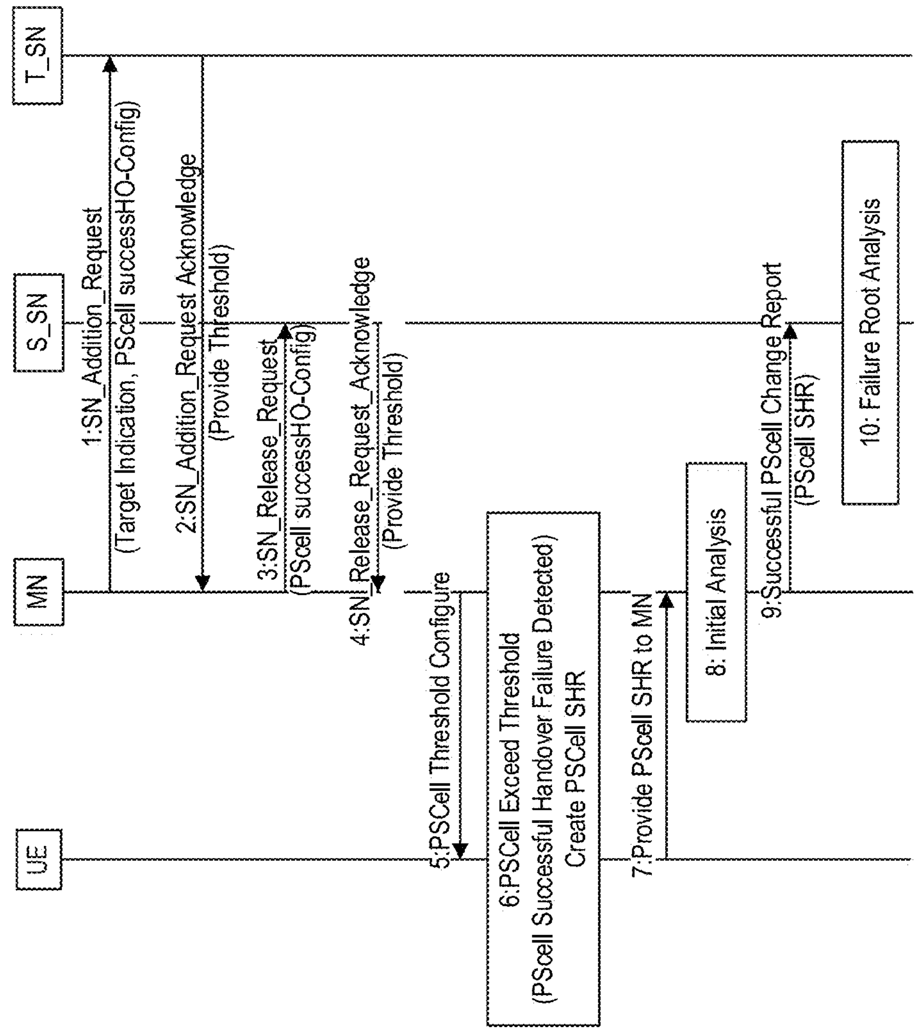
FIG. 9 illustrates a communication diagram of a procedure for a successful handover between a source NG-RAN and a target NG-RAN with a master node (MN) triggering intra-MN secondary node (SN) successful PSCell change failure and a user equipment (UE) providing a report to the MN, in accordance with an illustrative embodiment.

C. MN Triggered Intra-MN Inter SN Successful PSCell Change Failure, and UE Providing Report to MN Referring now to FIG. 9, depicted is a communication diagram of a procedure for a successful handover between a

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID | | | |
| 9.2.3.16 | Allocated at the S-NG-RAN node | YES | reject | | | |
| Cause | M | | 9.2.3.2 | | YES | ignore |
| | | -- omit unchanged part | | | | |
| PDCP Change Indication | O | | 9.2.3.74 | | YES | ignore |
| Successful PSCell Change Report List | | 1 | | | YES | ignore |
| >Successful PSCell Change Report Item | | 1 . . . <maxnoofPSCell SuccessfulChangeReports> | | | — | |
| >>Successful PSCell Change Report Container | M | | OCTET STRING | SuccessPSCell Change-Report. | — | |

In some embodiments, a new message called 'Successful PSCell change report' may be introduced and an example is shown as below. In some embodiments, this message may be sent by M-NG-RAN node to S-NG-RAN node to report a list of Successful PSCell change failure event. This message may be sent by S-NG-RAN node to M-NG-RAN node to report a list of Successful PSCell change failure event. The direction may be from M-NG-RAN node to the S-NG-RAN node and from the S-NG-RAN node to the M-NG-RAN node.

source NG-RAN and a target NG-RAN with a master node (MN) triggering intra-MN secondary node (SN) successful PSCell change failure and a user equipment (UE) providing a report to the MN. As shown, the UE may move from source SN to target SN with connects to the same MN. Successful PSCell change may occur during the SN change.

At steps 1 and 2, the MN may trigger SN change by a SN Addition procedure. The MN may initiate the SN change by requesting the target SN to allocate resources for the UE by means of the SN Addition procedure. The MN may include an indication to target SN in XnAP SN_Addition_Request

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| M-NG-RAN node UE XnAP ID | M | | NG-RAN node UE XnAP ID 9.2.3.16 | Allocated at the M-NG-RAN node. | YES | ignore |
| S-NG-RAN node UE XnAP ID | M | | NG-RAN node UE XnAP ID 9.2.3.16 | Allocated at the S-NG-RAN node. | YES | ignore |
| Source PSCell CGI | O | | Global NG-RAN Cell Identity 9.2.2.27 | NG-RAN CGI of source PSCell for PSCell change procedure | YES | ignore |
| Target PSCell CGI | O | | Global NG-RAN Cell Identity 9.2.2.27 | NG-RAN CGI of PSCell where SCG failure occurs for PSCell change procedure | YES | ignore |
| Successful PSCell Change Report List | | 1 | | | YES | ignore |
| >Successful PSCell Change Report Item | | 1 . . . <maxnoofPSCell SuccessfulChangeReports> | | | — | |
| >>Successful PSCell Change Report Container | M | | OCTET STRING | SuccessPSCell Change-Report. | — | |
| SN Mobility Information | O | | BIT STRING (SIZE (32)) | Information related to the PSCell change. It's provided by S-NG-RAN node in order to enable later analysis of the conditions that led to wrong PSCell change. | YES | ignore |

message and target SN response with T304 threshold in XnAP SN_Addition_Request Acknowledge.

A new request (S-NODE ADDITION REQUEST) Threshold type Indication may be introduced in legacy Xnap message to enable MN to request SN provide corresponding Timer threshold as shown below. This message may be sent by the M-NG-RAN node to the S-NG-RAN node to request the preparation of resources for dual connectivity operation for a specific UE. The direction may be from M-NG-RAN node to the S-NG-RAN node.

An example of S-NODE RELEASE REQUEST as below to show a new request Threshold type indication is introduced in legacy Xnap message to enable MN to request SN provide corresponding Timer threshold.

9.1.2.14 S-NODE RELEASE REQUEST

This message is sent by the M-NG-RAN node to the S-NG-RAN node to request the release of resources.

Direction: M-NG-RAN node→S-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| UE Security Capabilities | M | | 9.2.3.49 | | YES | reject |
| S-NG-RAN node Security Key | M | | 9.2.3.51 | | YES | reject |
| S-NG-RAN node UE Aggregate Maximum Bit Rate | M | | UE Aggregate Maximum Bit Rate 9.2.3.17 | The UE Aggregate Maximum Bit Rate is split into M-NG-RAN node UE Aggregate Maximum Bit Rate and S-NG-RAN node UE Aggregate Maximum Bit Rate which are enforced by M-NG-RAN node and S-NG-RAN node respectively. | YES | reject |
| | | | Omit unchanged part | | | |
| Request Threshold type Indication | | | ENUMERATED (Target, Source, Target&Source, . . .) | Indicator the request successful PSCell change type | Yes | ignore |

An SN node may provide corresponding Timer threshold to MN via, for example, a

S-NODE MODIFICATION REQUEST ACKNOWLEDGE message. This message may be sent by the S-NG-RAN node to confirm the M-NG-RAN node's request to modify the S-NG-RAN node resources for a specific UE.

The direction may be from S-NG-RAN node to the M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | ignore |
| S-NG-RAN node UE XnAP ID | M | | NG-RAN node UE XnAP ID 9.2.3.16 | Allocated at the S-NG-RAN node | YES | ignore |
| | | | Omit unchanged part | | | |
| Timer Threshold | | | | | | |
| >T310 Threshold | O | | ENUMERATED {p40, p60, p80, spare5, spare4, spare3, spare2, spare1} | | YES | ignore |
| >T312 Threshold | O | | ENUMERATED {p20, p40, p60, p80, spare4, spare3, spare2, spare1} | | YES | ignore |
| >T304 Threshold | O | | ENUMERATED {p40, p60, p80, spare5, spare4, spare3, spare2, spare1} | | YES | ignore |

Step 3-4: The MN Initiates the Release of the Source SN Resources by SN Release Procedure.

The MN may include and indication to source SN in XnAP SN_Release_Request message, Soruce SN response with T310/T312 threshold in XnAP SN_Release_Request Acknowledge message.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | O | | NG-RAN node UE XnAP ID 9.2.3.16 | Allocated at the S-NG-RAN node | YES | reject |
| Cause | M | | 9.2.3.2 | | YES | ignore |
| PDU Session Resources To Be Released List | O | | PDU session List with Cause 9.2.1.26 | | YES | ignore |
| UE Context Kept Indicator | O | | 9.2.3.68 | | YES | ignore |
| M-NG-RAN node to S-NG-RAN node Container | O | | OCTET STRING | Includes the CG-ConfigInfo message as defined in subclause 11.2.2 of TS 38.331 [10]. | YES | ignore |
| DRBs transferred to MN | O | | DRB List 9.2.1.29 | Indicates that the target M-NG-RAN node reconfigured the listed DRBs as MN-terminated bearers. | YES | ignore |
| Request Threshold type Indication | O | | ENUMERATED (Target, Source, Target&Source, . . .) | Indicator the request successful PSCell change type | Yes | ignore |

Another example below may be to show how SN node provide corresponding Timer threshold to MN in an S-NODE RELEASE REQUEST ACKNOWLEDGE message. This message may be sent by the S-NG-RAN node to the M-NG-RAN node to confirm the request to release S-NG-RAN node resources. The direction may be from the S-NG-RAN node to the M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | O | | NG-RAN node UE XnAP ID 9.2.3.16 | Allocated at the S-NG-RAN node | YES | reject |
| PDU sessions To Be Released List | | 0 . . . 1 | | | YES | ignore |
| >PDU Session Resources To Be Released List - SN terminated | O | | PDU Session List with data forwarding request info 9.2.1.24 | | — | |
| Criticality Diagnostics | O | | 9.2.3.3 | | YES | ignore |
| SCG UE History Information Timer Threshold | O | | 9.2.3.151 | | YES | ignore |
| >T310 Threshold | O | | ENUMERATED {p40, p60, p80, spare5, spare4, spare3, spare2, spare1} | | YES | ignore |
| >T312 Threshold | O | | ENUMERATED {p20, p40, p60, p80, spare4, spare3, spare2, spare1} | | YES | ignore |
| >T304 Threshold | O | | ENUMERATED {p40, p60, p80, spare5, spare4, spare3, spare2, spare1} | | YES | ignore |

Steps 5 and 6 may be are the same as steps 5 and 6 in the embodiment described in FIG. 7. Steps 7, 8, and 9 may be the same as Step 8, 9, and 10 in the embodiments described in FIG. 8

Figure 10:
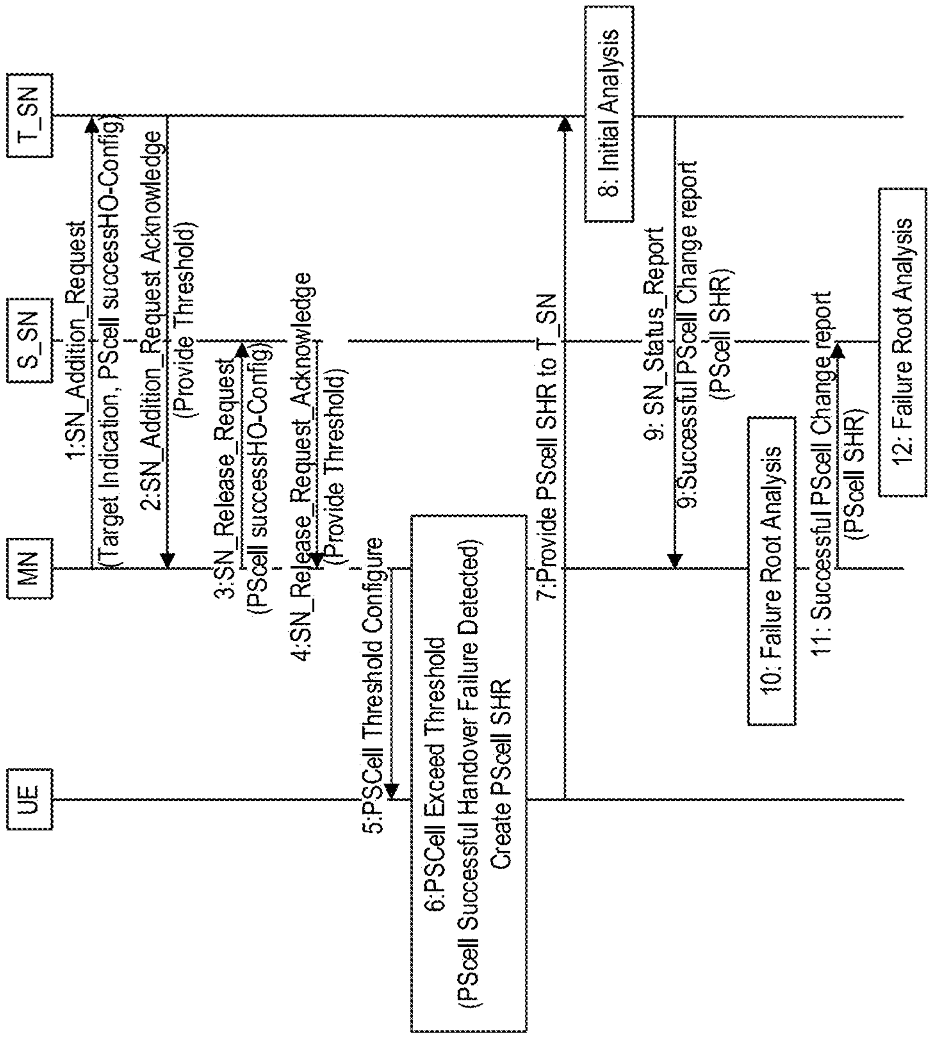
FIG. 10 illustrates a communication diagram of a procedure for a successful handover between a source NG-RAN and a target NG-RAN with a master node (MN) triggering intra-MN secondary node (SN) successful PSCell change failure and a user equipment (UE) providing a report to a target SN, in accordance with an illustrative embodiment.

D, MN Triggered Intra-MN Inter SN Successful PSCell Change Failure and UE Providing Report to the Target SN Referring now to FIG. 10, depicted is a communication diagram of a procedure for a successful handover between a source NG-RAN and a target NG-RAN with a master node (MN) triggering intra-MN secondary node (SN) successful PSCell change failure and a user equipment (UE) providing a report to a target SN. Steps 1-6 may be the same as steps 1-6 of the embodiment described in FIG. 9.

At step 7, the UE may provide Successful PSCell change information to the target SN. The UE may provide the information via SRB3 to target SN. At step 8, the Target SN may enforce an initial analysis. Based on the Successful PSCell change information received from the UE, the target SN may decide to transfer Successful PSCell change information to the source SN. Since there is no direct connection between source SN and target SN, the target SN at first, may transfer the information to the MN. At step 9, the target SN may transfer Successful PSCell change information to the MN.

The target SN may leverage legacy message or use new message to transmit the information to MN. For example, the legacy message, SN STATUS TRANSFER can be reused with enhancement to transfer the information. The updated SN STATUS TRANSFER message is shown below.

This message may be sent by the source NG-RAN node to the target NG-RAN node to transfer the uplink or downlink packet data convergence protocol (PDCP) sequence number (SN) and a hyper frame number (HFN) status during a handover or for dual connectivity. The direction may be from source NG-RAN node to the target NG-RAN node (handover). The direction may be from NG-RAN node from which the data radio bearer (DRB) context is transferred to the NG-RAN node to which the DRB context is transferred (RRC connection re-establishment or dual connectivity).

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| Source NG-RAN node UE XnAP ID | M | | NG-RAN node UE XnAP ID 9.2.3.16 | Allocated for handover at the source NG-RAN node and for dual connectivity at the NG-RAN node from which the DRB context is transferred. | YES | reject |
| Target NG-RAN node UE XnAP ID | M | | NG-RAN node UE XnAP ID 9.2.3.16 | Allocated for handover at the target NG-RAN node and for dual connectivity at the NG-RAN node to which the DRB context is transferred. | YES | reject |
| DRBs Subject To Status Transfer List | M | | 9.2.1.14 | | YES | ignore |
| CHO Configuration | O | | 9.2.2.76 | | YES | ignore |
| Mobility Information | O | | BIT STRING (SIZE (32)) | | YES | ignore |
| Successful PSCell Change Report List | | 1 | | | YES | ignore |
| >Successful PSCell Change Report Item | | 1 . . . <maxnoofPSCell SuccessfulChangeReports> | | | — | |
| >>Successful PSCell Change Report Container | M | | OCTET STRING | SuccessPSCell Change-Report. | — | |

Take new message as example, a new designed message with name 'Successful PSCell change report" has been described in step 9 as described above in conjunction with FIG. 9. At step 10, the MN may enforce failure root analysis.

Steps 11 and 12 may be same as steps 9 and 10 in the embodiment as shown in FIG. 9.

E. MN Triggered Intra-MN Inter SN Successful PSCell Change Failure, and UE Providing Report to the Source SN.

Figure 11:
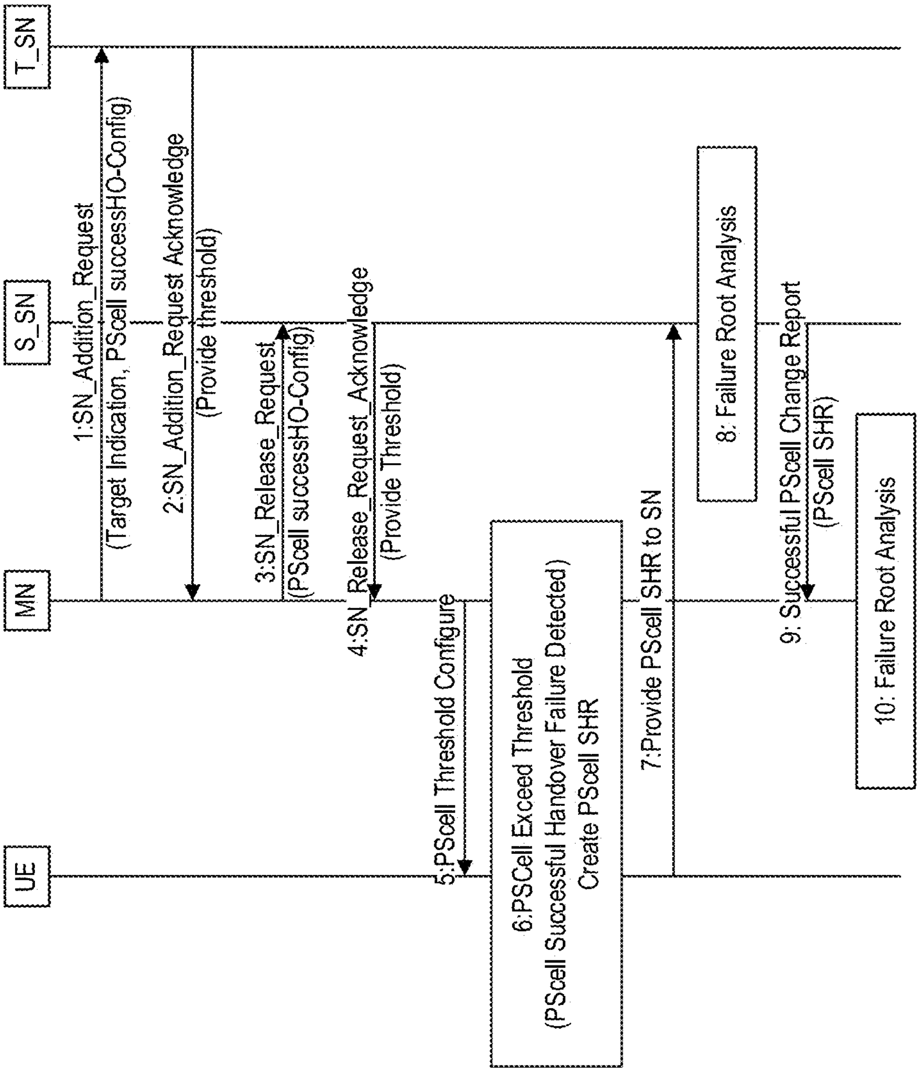
FIG. 11 illustrates a communication diagram of a procedure for a successful handover between a source NG-RAN and a target NG-RAN with a master node (MN) triggering intra-MN secondary node (SN) successful PSCell change failure and a user equipment (UE) providing a report to a source SN, in accordance with an illustrative embodiment.

Referring now to FIG. 11, depicted is a communication diagram of a procedure for a successful handover between a source NG-RAN and a target NG-RAN with a master node (MN) triggering intra-MN secondary node (SN) successful PSCell change failure and a user equipment (UE) providing a report to a source SN.

Step 1-6 may be the same as step 1-6 in the embodiment shown in FIG. 10. At step 7, the UE may provide Successful PSCell change information to the source SN. At Step 8, the source SN may enforce failure root analysis. Step 9 may be the same as step 9 in the embodiment described in FIG. 10. \At Step 10, the MN may enforce failure root analysis.

F. SN Triggered Intra-MN Inter SN Successful PSCell Change Failure, UE Providing Report to the MN.

Figure 12:
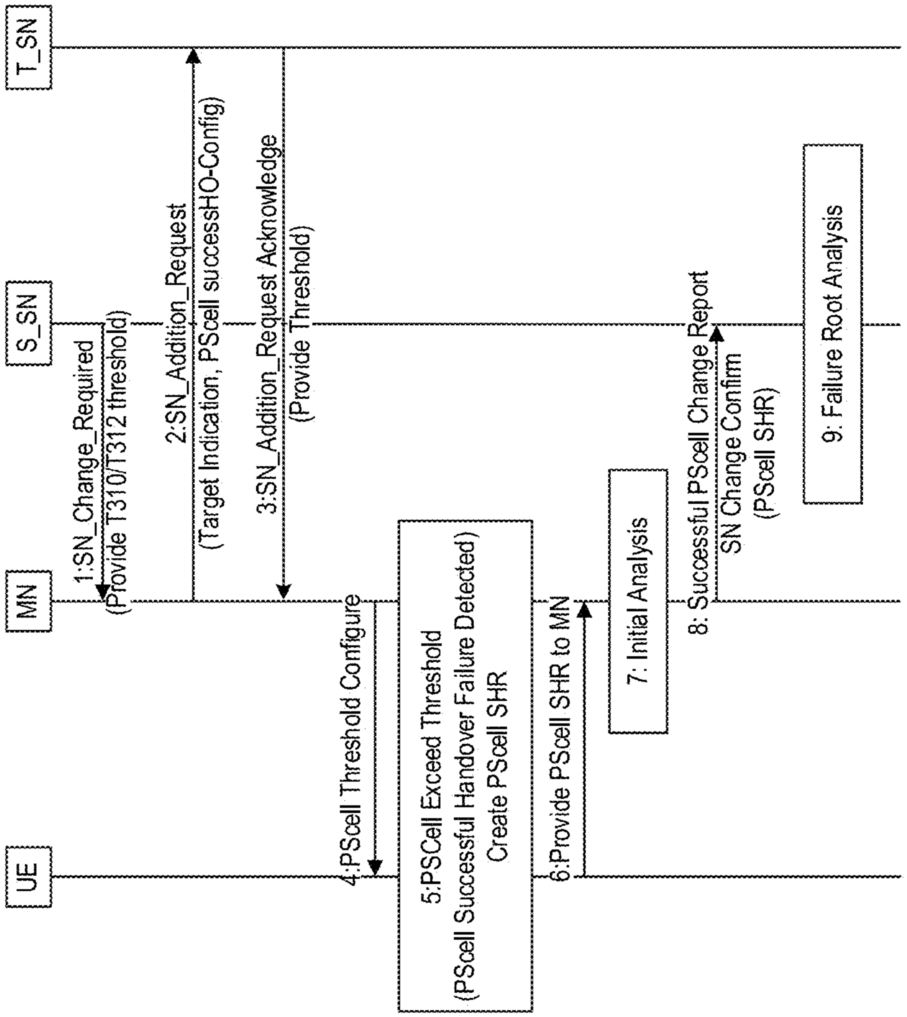
FIG. 12 illustrates a communication diagram of a procedure for a successful handover between a source NG-RAN and a target NG-RAN with a secondary node (SN) triggering intra-master node (MN) SN successful PSCell change failure and a user equipment (UE) providing a report to the MN, in accordance with an illustrative embodiment.

Referring now to FIG. 12, depicted is a communication diagram of a procedure for a successful handover between a source NG-RAN and a target NG-RAN with a secondary node (SN) triggering intra-master node (MN) SN successful PSCell change failure and a user equipment (UE) providing a report to the MN.

At step 1, the source SN may initiate the conditional SN change procedure. The source SN may initiate the SN change procedure by sending SN Change Required message containing T310/T312 threshold. An example of updated SN Change Required message is shown below. This message may be sent by the S-NG-RAN node to the M-NG-RAN node to trigger the change of the S-NG-RAN node. The direction may be from the S-NG-RAN node to the M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| Target S-NG-RAN node ID | M | | Global NG-RAN Node ID 9.2.2.3 | | YES | reject |
| Cause | M | | 9.2.3.2 | | YES | ignore |
| | | | Omit unchanged part | | | |
| Timer Threshold | | | | | | |
| >T310 Threshold | O | | ENUMERATED {p40, p60, p80, spare5, spare4, spare3, spare2, spare1} | | YES | ignore |
| >T312 Threshold | O | | ENUMERATED {p20, p40, p60, p80, spare4, spare3, spare2, spare1} | | YES | ignore |

Steps 2 and 3 may be same as steps 1 and 2 of the embodiment described in FIG. 9. Steps 4-9 may be same as steps 5-10 of the embodiment described in FIG. 9.

G. Inter-MN Inter SN Successful PSCell Change Failure

Figure 13:
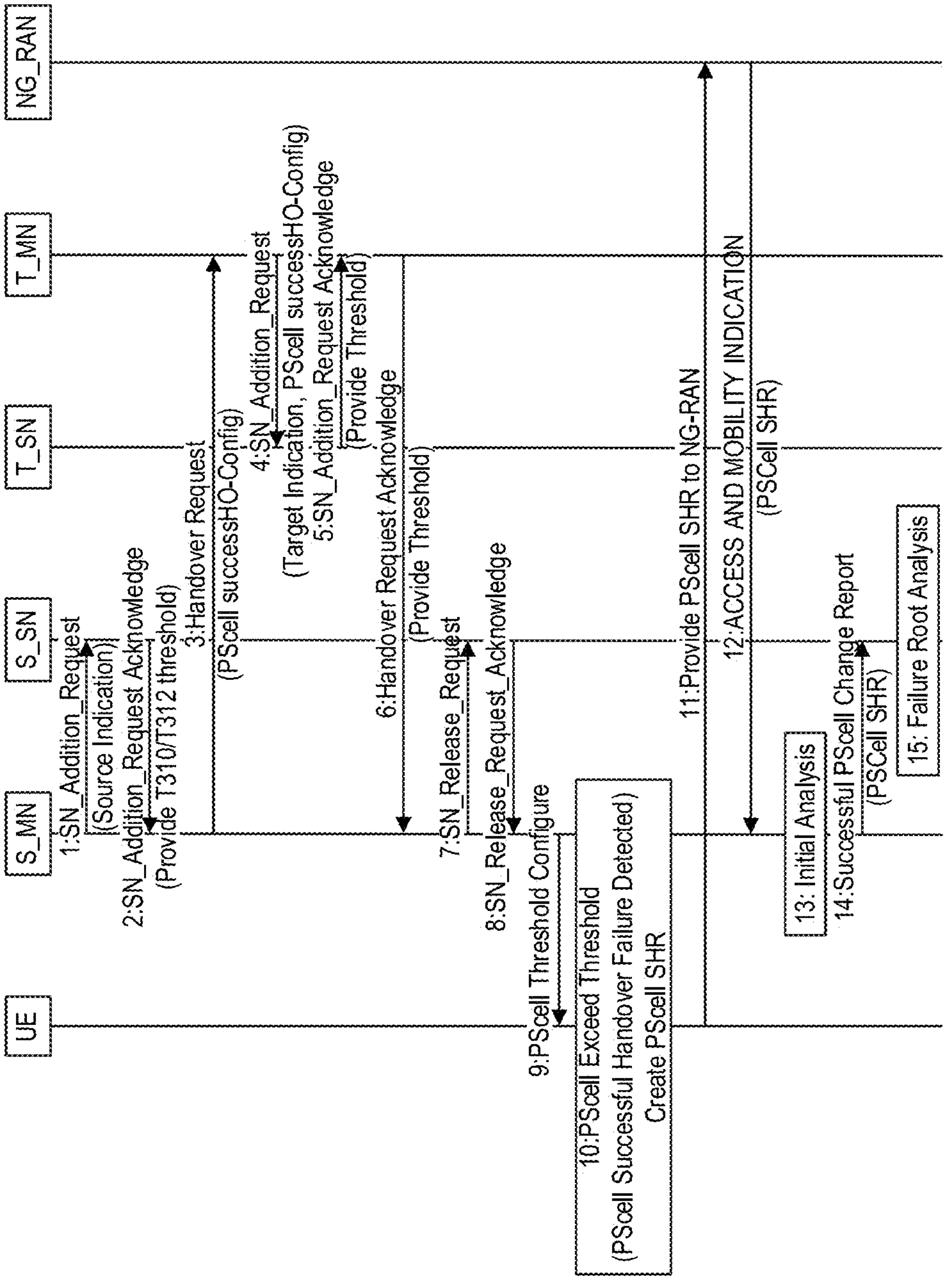
FIG. 13 illustrates a communication diagram f a procedure for a successful handover between a source NG-RAN and a target NG-RAN with a master node (MN) triggering inter-MN secondary node (SN) successful PSCell change failure, in accordance with an illustrative embodiment.

Referring now to FIG. 13, a communication diagram of a procedure for a successful handover between a source NG-RAN and a target NG-RAN with a master node (MN) triggering inter-MN secondary node (SN) successful PSCell change failure. Steps 1 and 2 may be same as the steps 1 and 2 of the embodiment described in FIG. 9.

At step 3, the source MN may start the handover procedure by initiating the Xn Handover Preparation procedure. The T310/T312 threshold from source SN may be carried in Handover Request message. At steps 4 and 5, the Target MN send SN addition request may be sent to target SN. Steps 4 and 5 may be the same as steps 1 and 2 of the embodiment described in FIG. 9. At step 6, the target MN may include within the Handover Request Acknowledge message the T310/T312/T304 threshold. Steps 8-13 may be the same as steps 5-10 of the embodiment described in FIG. 3.

H. Signalling of CU-DU Split Architecture

Figure 14:
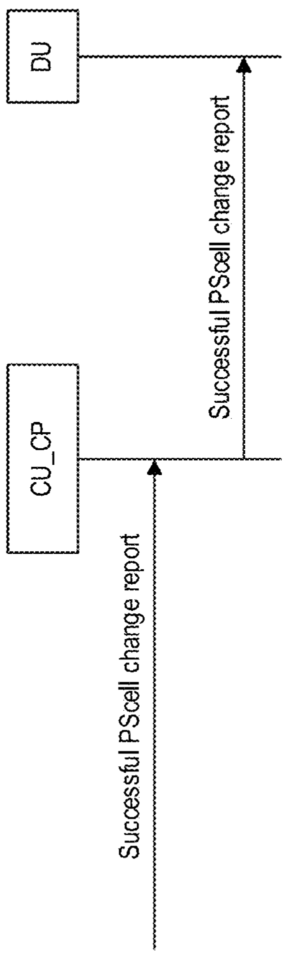
FIG. 14 illustrates a communication diagram of a procedure for signaling centralized unit (CU) and distributed unit (DU) spit architecture, in accordance with an illustrative embodiment.

Referring now to FIG. 14, DEPICTED IS a communication diagram of a procedure for signaling centralized unit (CU) and distributed unit (DU) spit architecture. The method may be to provide Successful PSCell change report in CU-DU split architecture. When CU-CP of MN, Source SN, of Target SN received the report, the node can provide the report to DU via a new introduced IE 'Successful PSCell Change Report List'. An example of reused legacy message of F1AP ACCESS AND MOBILITY INDICATION is shown as below.

This message may be sent by gNB-CU to gNB-DU to provide access and mobility information to the gNB-DU. The direction may be from gNB-CU to the gNB-DU.

Figure 15:
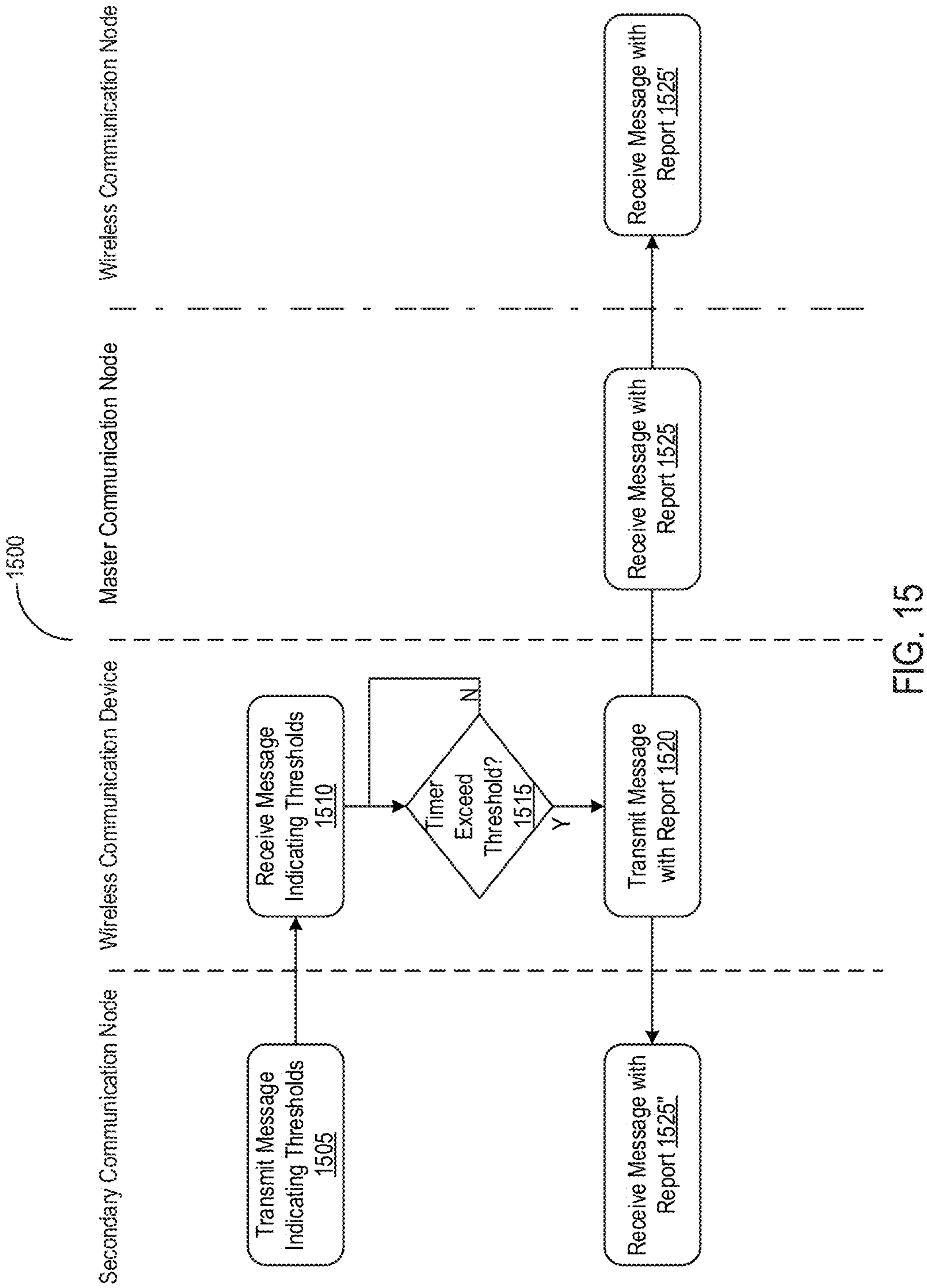
FIG. 15 illustrates a flow diagram of a method of optimizing successful PSCell change procedure without master communication nodes, in accordance with an illustrative embodiment.

I. Method of Optimizing Successful PSCell Change Procedure Without Master Communication Nodes Referring now to FIG. 15, depicted is a flow diagram of a method 1500 of optimizing successful PSCell change procedure without master communication nodes. The method 1500 may be implemented by or performed using any of the components detailed herein, such as a BS 102 or 202 and UE 104 or 204. In overview, a secondary communication node may transmit a message indicating thresholds (1505). A wireless communication device may receive the message indicating thresholds (1510). The wireless communication device may determine whether a timer exceeds a corresponding threshold (1515). If the timer exceeds the threshold, the wireless communication device may transmit a message with a report (1520). A master communication node, a wireless communication node, or the secondary communication node may receive the message with the report (1525, 1525', or 1525").

In further detail, a secondary communication node (e.g., BS 102 or 202) may provide, send, or otherwise transmit a message indicating thresholds to a wireless communication device (e.g., UE 104 or 204) (1505). The message may be transmitted prior to requesting a handover procedure to change a primary cell in a secondary cell group (PSCell) in a secondary communication node (e.g., BS 102 or 202). In some embodiments, the message may identify, define, or otherwise indicate respective thresholds of one or more successful PSCell change timers. Each timer may specify, define, or otherwise identify an amount of time in which a PSCell change is to considered to successful or not.

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |
| RACH Report Information List | | 0 . . . 1 | | | YES | ignore |
| >RACH Report Information Item | | 1 . . . <maxnoofRACHReports> | | | — | |
| >>RACH Report Container | M | | OCTET STRING | RA-ReportList-r16 IE as defined in subclause 6.2.2 in TS 38.331 [8]. | — | |
| >>UE Assistant Identifier | O | | gNB-DU UE F1AP ID 9.3.1.5 | | — | |
| RLF Report Information List | | 0 . . . 1 | | | YES | ignore |
| >RLF Report Information Item | | 1 . . . <maxnoofRLFReports> | | | — | |
| >>NR UE RLF Report Container | M | | OCTET STRING | nr-RLF-Report-r16 IE contained in the UEInformationResponse message defined in TS 38.331 [8]. | — | |
| >>UE Assistant Identifier | O | | gNB-DU UE F1AP ID 9.3.1.5 | | — | |
| Successful HO Report Information List | | 0 . . . 1 | | | YES | ignore |
| >Successful HO Report Information Item | | 1 . . . <maxnoofSuccessfulHOReports> | | | — | |
| >>Successful HO Report Container | M | | OCTET STRING | | — | |
| Successful PSCell Change Report List | | 1 | | | YES | ignore |
| >Successful PSCell Change Report Item | | 1 . . . <maxnoofPSCell SuccessfulChangeReports> | | | — | |
| >>Successful PSCell Change Report Container | M | | OCTET STRING | SuccessPSCell Change-Report. | — | |

The wireless communication device may retrieve, identify, or otherwise receive the message indicating thresholds from the secondary communication node (1510). Upon receipt, the wireless communication node may parse the message to extract or identify the thresholds of the one or more successful PSCell change timers. The wireless communication device may identify or determine whether at least one timer exceeds a corresponding threshold (1515). The wireless communication device may compare the threshold as specified by the message with the corresponding PSCell change timer. If none of the timers exceed the respective thresholds, the wireless communication device may continue to monitor the timers and repeat the step.

If at least one timer exceeds the corresponding threshold, the wireless communication device may send, provide, or otherwise transmit a message with a report (1520). The report may be associated with the handover, and may identify or include one or more information elements (IEs) for the handover procedure to change the PSCell in the secondary communication node. In some embodiments, the report may be directly sent from the wireless communication device to a master communication node (e.g., BS 102 or 202). The message with the report may be sent to the master communication node when the at least one timer exceeds the corresponding threshold. In some embodiments, the report may be sent from the wireless communication device to a wireless communication node (e.g., BS 102 or 202). The message with the report may be sent to the wireless communication node when the at least one timer exceeds the corresponding threshold. In some embodiments, the report may be sent from the wireless communication device to the secondary communication node. The report sent to the secondary communication node may identify or include a Successful PSCell Change Report Container.

The master communication node may retrieve, identify, or otherwise receive the message with the report from the wireless communication device (1525). In some embodiments, upon receipt, the wireless communication node may transmit, forward, or otherwise send the message with the report to the master communication node. The report sent to the wireless communication node may identify or include at least one of: a Successful PSCell Change Report List; a Successful PSCell Change Report List Item; or a Successful PSCell Change Report Container, among others, as discussed above. In some embodiments, the wireless communication node may retrieve, identify, or otherwise receive the message with the report from the wireless communication device via the master communication node (1525'). In some embodiments, the secondary communication node may receive the message with the report (1525").

Figure 16:
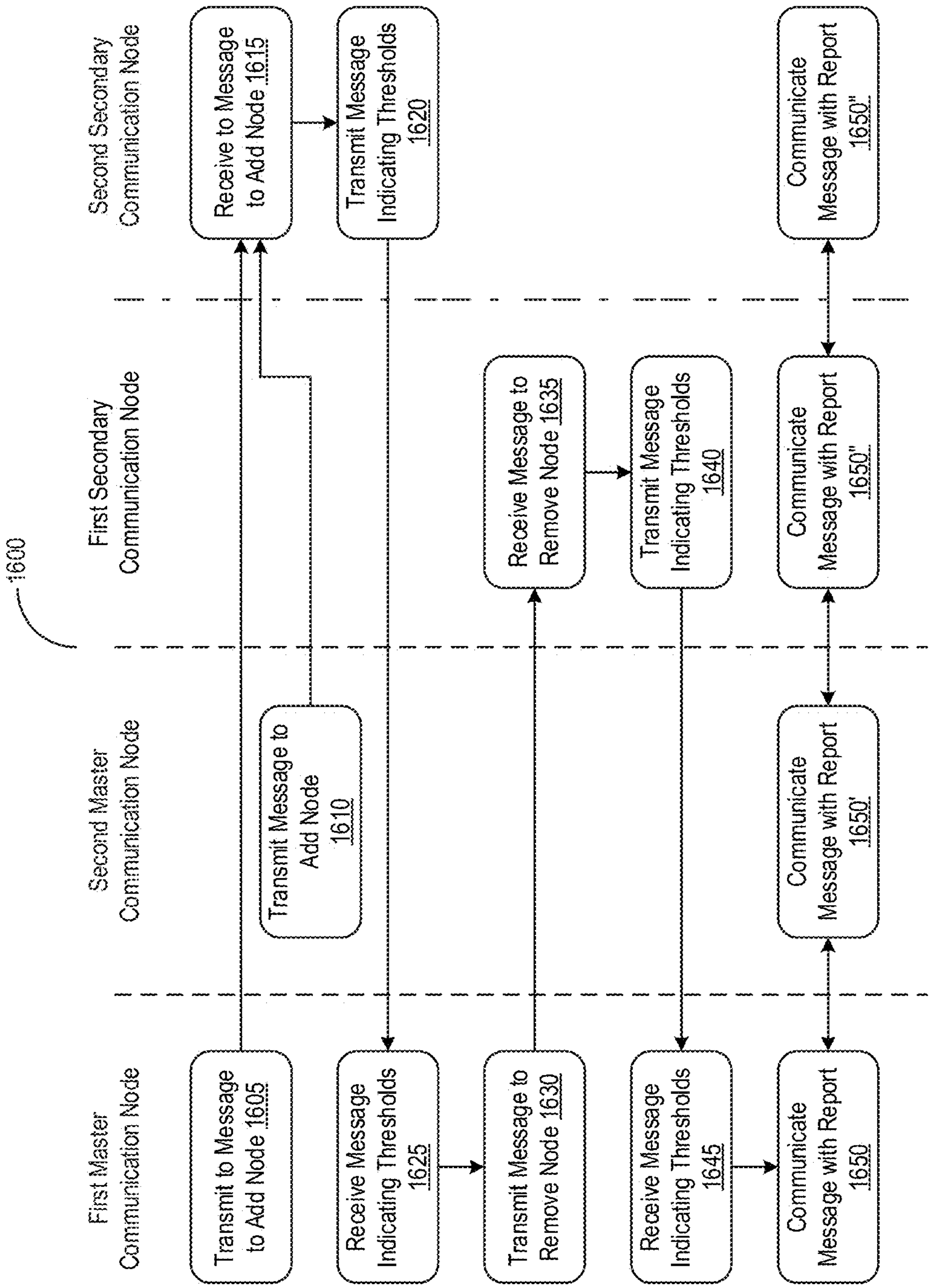
FIG. 16 illustrates a flow diagram of a method of optimizing successful PSCell change procedure with master communication nodes, in accordance with an illustrative embodiment.

J. Method of Optimizing Successful PSCell Change Procedure Witt Master Communication Nodes Referring now to FIG. 16, depicted is a flow diagram of a method 1600 of optimizing successful PSCell change procedure with master communication nodes. The method 1600 may be implemented by or performed using any of the components detailed herein, such as a BS 102 or 202 and UE 104 or 204. In overview, a first master communication node may transmit a message to add a node (1605). A second master communication node may send a message to add a node (1610). A second secondary communication node may receive the message to add the node (1615). The second secondary communication node may transmit a message indicating thresholds (1620). The first master communication node may receive the message indicating thresholds (1625). The first master communication node may transmit a message to remove a node (1630). A first secondary communication node may receive the message to remove the node (1635). The first secondary communication node may transmit a message indicating thresholds (1640). The first master communication node may receive the message indicating the thresholds (1645). The first master communication node, the second master communication node, the first secondary communication node, and the secondary communication node may communicate a message with a report (1650, 1650', 1650", or 1650'").

In further detail, a first master communication node (e.g., BS 101 or 202) may provide, send, or otherwise transmit a message to request to add a second secondary communication node (e.g., BS 102 or 202) to the second secondary communication node (1605). In some embodiments, the message may identify or include a Request Threshold Type Indication. In some embodiments, second master communication node may provide, transmit, or otherwise send a message to request to add the second secondary communication node (1610). The message sent by the second master communication node may be separate from the message sent by the first master communication node. The second secondary communication node may retrieve, identify, or otherwise receive the message to request to add the second secondary communication node from the first maser communication node (1615). In some embodiments, the second secondary communication node may receive the message to request to add from the second master communication node. Upon receipt, the second secondary communication node may parse the message to extract or identify the request to add.

The second secondary communication node may provide, send, or otherwise transmit a message indicating thresholds to the first master communication node (1620). In some embodiments, the message may define, identify, or otherwise indicate a threshold of a first PSCell timer. In some embodiments, the message may define, identify, or otherwise indicate a threshold of a first PSCell timer and a second PSCell timer. Each threshold may define a value for a corresponding timer at which to determine whether the PSCell change is successful or failure. The threshold of the first or second PSCell timers may be included when the message to request to add is received from the first master communication node. In some embodiments, the second secondary communication node may provide, send, or otherwise transmit another message, when the message to request to add is received from the second master communication node. The message to be sent in response to the request may define, identify, or otherwise indicate a threshold of a third PSCell timer. The first master communication node may retrieve, identify, or otherwise receive the message indicating thresholds from the second secondary communication node (1620). Upon receipt, the first master communication node may parse the message to extract or identify the threshold of the first PSCell timer and/or the second PSCell timer.

The first master communication node may send, provide, or otherwise transmit a message to remove a first secondary communication node (e.g., BS 102 or 202) to the first secondary communication node (1630). The message may be to request a handover procedure to change a first primary cell in a secondary cell group (PSCell) in the first secondary communication node. The first secondary communication node may in turn retrieve, identify, or otherwise receive the message to request to remove the first secondary communication node (1635). The first secondary communication node may parse the message to extract or identify the request. The first secondary communication node may send, provide, or otherwise transmit a message indicating thresholds to the first master communication node (1640). In some embodiments, the message may define, identify, or indicate respective thresholds of a second PSCell timer and a third PSCell timer. The first master communication node may retrieve, identify, or otherwise receive the message indicating the thresholds from the first secondary communication node (1645). Upon receipt, the first master communication node may parse the message to extract or identify the thresholds of the second PSCell timer and the third PSCell timer.

The first master communication node, the second master communication node, the first secondary communication node, the secondary communication node, or a wireless communication device (e.g., UE 104 or 204) may communicate a message with a report (1650, 1650', 1650'', or 1650'''). The report may be associated with the handover procedure. The report may identify or include: an identification of the first PSCell; an identification of a second PSCell to which the first PSCell is changed; an identification of a PCell in the first master communication node; a measurement result of one or more neighbor cells; a Successful PScell Change cause; a location; a Cell Radio Network Temporary Identifier (C-RNTI) of the first PSCell; or a Cell Radio Network Temporary Identifier (C-RNTI) of the second PSCell, among others. In some embodiments, the report of the message may include a Successful PSCell Change Report Container.

In some embodiments, the first master communication node may send the message with the report to the first secondary communication node. In some embodiments, the first master communication node may receive the message with the report from the first secondary communication node. The message from the first secondary communication node may identify or include a Successful PSCell Change Report List; a Successful PSCell Change Report List Item; or a Successful PSCell Change Report Container, among others. In some embodiments, the first master communication node may provide, forward, or transmit the message from the second secondary communication node to the first secondary communication node. In some embodiments, the first master communication node may retrieve, identify, or otherwise receive a message with the report from the wireless communication node. The first master communication node may send, provide, or otherwise transmit the message including the report from the wireless communication node to the first secondary communication node.

Figure 17:
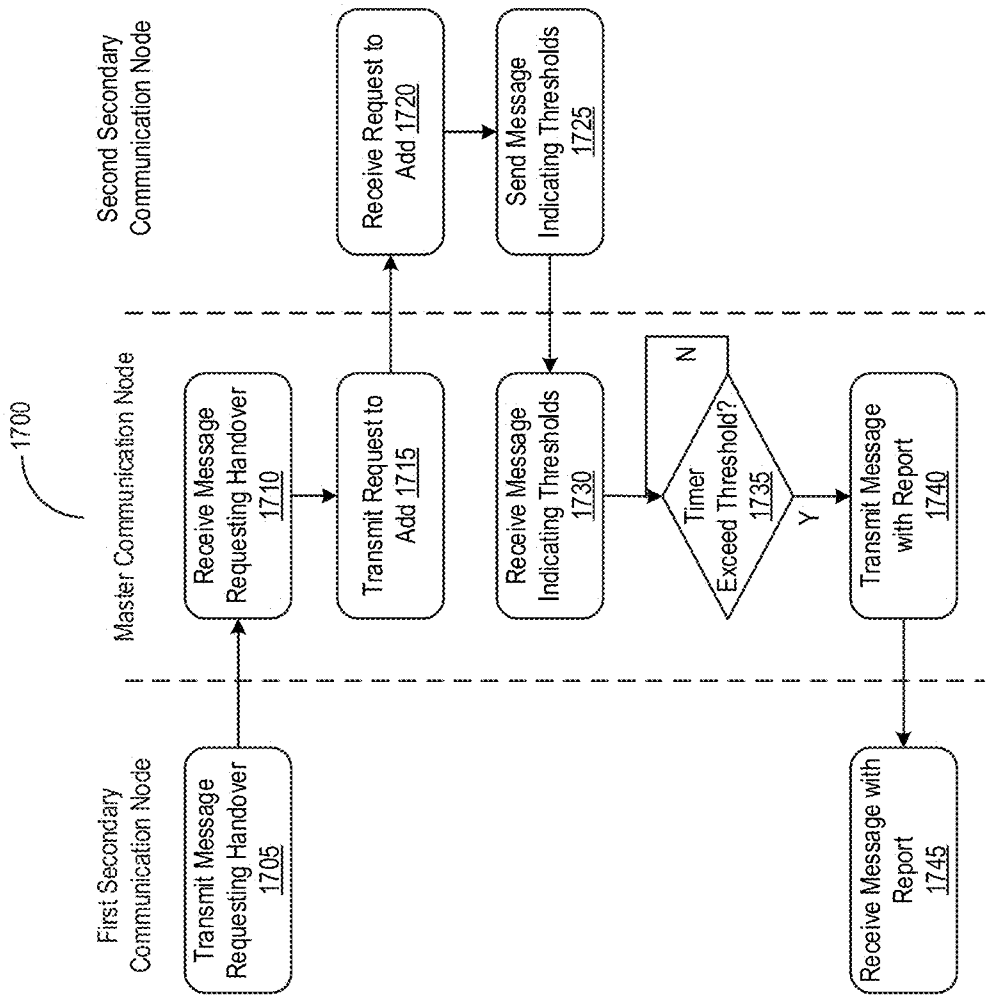
FIG. 17 illustrates a flow diagram of a method of optimizing successful PSCell change procedure triggered by secondary communication nodes, in accordance with an illustrative embodiment.

K. Method of Optimizing Successful PSCell Change Procedure Triggered by Secondary Communication Nodes Referring now to FIG. 17, depicted is a flow diagram of a method 1700 of optimizing successful PSCell change procedure triggered by secondary communication nodes. The method 1700 may be implemented by or performed using any of the components detailed herein, such as a BS 102 or 202 and UE 104 or 204. In overview, a first secondary communication node may transmit a message requesting handover (1705). A master communication node may receive the message requesting handover (1710). The master communication node may transmit a request to add (1715). A second secondary communication node may receive the request to add (1720). The second secondary communication node may send a message indicating threshold (1725). The master communication node may receive the message indicating the thresholds (1730). The master communication node may determine whether a timer exceeds a corresponding threshold (1735). If the timer exceeds a corresponding threshold, the master communication node may transmit a message with a report (1740). The first secondary communication node may receive the message with the report (1745).

In further detail, a first secondary communication node (e.g., BS 102 or 202) may provide, send, or otherwise transmit a message to a master communication node (e.g., BS 102 or 202) (1705). The message may be request a handover procedure to a change a first primary cell in a secondary cell group (PSCell) in the first secondary communication node. In some embodiments, the message may define, identify, or otherwise indicate thresholds of a first PSCell timer and a second PSCell timer. The respective thresholds may define a time for the first PSCell timer or the second PSCell timer at which the PSCell change is determined to be successful or a failure. The master communication node may retrieve, identify, or otherwise receive the message requesting handover from the first secondary communication node (1710).

In some embodiments, the master communication node may send, provide, or otherwise transmit a message to request to add a second secondary communication node (e.g., BS 102 or 202) to the second secondary communication node (1715). The second secondary communication node may retrieve, identify, or otherwise receive the message to request to add form the master communication node (1720). In response to the receipt of the message, the second secondary communication node may send, provide, or otherwise transmit a message indicating thresholds to the master communication node (1725). The message may define, identify, or otherwise indicate a threshold of a third PSCell timer. The master communication node may retrieve, identify, or receive the message indicating the thresholds from the second secondary communication node (1730).

The master communication node may identify determine whether a timer exceeds a corresponding threshold (1735). If none of the timers exceed the corresponding threshold, the master communication node may continue to determine and repeat the step. Otherwise, if the timer exceeds a corresponding threshold, the master communication node may provide, send, or otherwise transmit a message with a report (1740). The report may be associated with the handover procedure. The first secondary communication node may retrieve, identify, or otherwise receive the message with the report from the master communication node (1745).

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as “first,” “second,” and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A wireless communication method, comprising:

receiving, by a secondary communication node from a master communication node, configuration information for respective thresholds of one or more successful primary secondary cell (PSCell) change timers;

transmitting, by the secondary communication node to a wireless communication device, prior to requesting a handover procedure to change a PSCell in the secondary communication node, a first message indicating the respective thresholds of the one or more successful PSCell change timers; and receiving, by the secondary communication node from the master communication node, a second message including a report associated with the handover procedure.

2. The wireless communication method of claim 1, wherein the report of the second message includes a Successful PSCell Change Report Container.

3. The wireless communication method of claim 1, wherein the report is included in a third message directly sent from the wireless communication device to the master communication node.

4. The wireless communication method of claim 3, wherein the third message is sent from the wireless communication device to the master communication node, in response to the wireless communication device determining that at least one of the one or more timers exceeds its corresponding threshold.

5. The wireless communication method of claim 1, wherein the report is included in a fourth message sent from the wireless communication device to a wireless communication node, and then in a fifth message sent from the wireless communication node to the master communication node.

6. The wireless communication method of claim 5, wherein the fourth message is sent from the wireless communication device to the wireless communication node, in response to the wireless communication device determining that at least one of the one or more timers exceeds its corresponding threshold.

7. The wireless communication method of claim 5, wherein the report of the fifth message includes at least one of: a Successful PSCell Change Report List; a Successful PSCell Change Report List Item; or a Successful PSCell Change Report Container.

8. A method, comprising:

receiving, by a wireless communication device from a secondary communication node, prior to the secondary communication node requesting a handover procedure to change a primary secondary cell (PSCell) in the secondary communication node, a first message indicating respective thresholds of one or more successful PSCell change timers, wherein configuration information for the respective thresholds of the one or more successful PSCell change timers is received by the secondary communication node from a master communication node;

sending, by the wireless communication device to the master communication node, a report associated with the handover procedure;

wherein the report associated with the handover procedure is sent from the master communication node to the secondary communication node in a second message.

9. A wireless communication device, comprising:

at least one processor configured to:

receiving, via a receiver from a secondary communication node, prior to the secondary communication node requesting a handover procedure to change a primary secondary cell (PSCell) in the secondary communication node, a first message indicating respective thresholds of one or more successful PSCell change timers, wherein configuration information for the respective thresholds of the one or more successful PSCell change timers is received by the secondary communication node from a master communication node; and send, via a transmitter to the master communication node, a report associated with the handover procedure, wherein the report associated with the handover procedure is sent from the master communication node to the secondary communication node in a second message.

10. The wireless communication device of claim 9, wherein the report of the second message includes a Successful PSCell Change Report Container.

11. The wireless communication device of claim 9, wherein the report is included in a third message directly sent from the wireless communication device to the master communication node.

12. The wireless communication device of claim 11, wherein the third message is sent from the wireless communication device to the master communication node, in response to the wireless communication device determining that at least one of the one or more timers exceeds its corresponding threshold.

13. The wireless communication device of claim 9, wherein the report is included in a fourth message sent from the wireless communication device to a wireless communication node, and then in a fifth message sent from the wireless communication node to the master communication node.

14. A secondary communication node, comprising:

at least one processor configured to:

receive, via a receiver from a master communication node, configuration information for respective thresholds of one or more successful primary secondary cell (PSCell) change timers;

transmit, via a transmitter to a wireless communication device, prior to requesting a handover procedure to change a PSCell in the secondary communication node, a first message indicating the respective thresholds of the one or more successful PSCell change timers; and receive, via the receiver from the master communication node, a second message including a report associated with the handover procedure.

15. The secondary communication node of claim 14, wherein the report of the second message includes a Successful PSCell Change Report Container.

16. The secondary communication node of claim 14, wherein the report is included in a third message directly sent from the wireless communication device to the master communication node.

17. The secondary communication node of claim 16, wherein the third message is sent from the wireless communication device to the master communication node, in response to the wireless communication device determining that at least one of the one or more timers exceeds its corresponding threshold.

18. The secondary communication node of claim 14, wherein the report is included in a fourth message sent from the wireless communication device to a wireless communication node, and then in a fifth message sent from the wireless communication node to the master communication node.

19. The secondary communication node of claim 18, wherein the fourth message is sent from the wireless communication device to the wireless communication node, in response to the wireless communication device determining that at least one of the one or more timers exceeds its corresponding threshold.

20. The secondary communication node of claim 18, wherein the report of the fifth message includes at least one of: a Successful PSCell Change Report List; a Successful PSCell Change Report List Item; or a Successful PSCell Change Report Container.

* * * * *